(12) United States Patent
Nanduri et al.

(10) Patent No.: US 11,257,088 B2
(45) Date of Patent: Feb. 22, 2022

(54) KNOWLEDGE NEIGHBOURHOODS FOR EVALUATING BUSINESS EVENTS

(71) Applicant: MICROSOFT TECHNOLOGY LICENSING, LLC, Redmond, WA (US)

(72) Inventors: Jayaram N. M. Nanduri, Issaquah, WA (US); Yuting Jia, Redmond, WA (US); Hang Xu, Kenmore, WA (US); Anand Ravindra Oka, Bellevue, WA (US); John Alan Beaver, Kirkland, WA (US); Anton Khokhlov, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 48 days.

(21) Appl. No.: 16/685,824

(22) Filed: Nov. 15, 2019

(65) Prior Publication Data

US 2021/0097541 A1 Apr. 1, 2021

Related U.S. Application Data

(60) Provisional application No. 62/908,265, filed on Sep. 30, 2019.

(51) Int. Cl.
*G06N 20/00* (2019.01)
*G06Q 20/40* (2012.01)

(52) U.S. Cl.
CPC ......... *G06Q 20/4016* (2013.01); *G06N 20/00* (2019.01)

(58) Field of Classification Search
None
See application file for complete search history.

(56) References Cited

U.S. PATENT DOCUMENTS

| | | | | |
|---|---|---|---|---|
| 6,012,058 | A | * | 1/2000 | Fayyad ............... G06K 9/6223 |
| 7,165,037 | B2 | * | 1/2007 | Lazarus ............... G06Q 30/02 705/7.31 |

(Continued)

OTHER PUBLICATIONS

Yang, et al., "Based Big Data Analysis of Fraud Detection for Online Transaction Orders", In Proceedings of International Conference on Cloud Computing, Oct. 19, 2014, pp. 98-106.

(Continued)

*Primary Examiner* — Narayanswamy Subramanian
*Assistant Examiner* — Paul S Schwarzenberg
(74) *Attorney, Agent, or Firm* — Workman Nydegger

(57) ABSTRACT

Risk scores are generated by systems that use features or inputs from the current transactions, some summary statistics like velocity and some statistics calculated in batch mode which traverse hierarchical classification levels of entities, including classified attribute levels of known transactions, to identify neighborhoods of related entities and related transactions. Corresponding records of transaction information are extracted from or are otherwise generated from neighborhoods of the related transactions associated with the defined neighborhoods of entities/transactions. These records of transaction information are then used by a consortium risk engine to generate composite risk scores associated with information from multiple merchants/entities and that were only identified by traversing the hierarchical classification of the entities and/or the corresponding transactions, which are at least tangentially related to the new transaction(s), and which may be the basis for approving or denying the new transaction(s) and/or sending the new transaction(s) for manual review.

20 Claims, 16 Drawing Sheets

(56) References Cited

U.S. PATENT DOCUMENTS

| | | | |
|---|---|---|---|
| 7,376,618 B1* | 5/2008 | Anderson | G06Q 20/10 |
| | | | 705/38 |
| 7,403,922 B1* | 7/2008 | Lewis | G06Q 10/0635 |
| | | | 705/38 |
| 9,356,947 B2 | 5/2016 | Shraim et al. | |
| 9,811,830 B2 | 11/2017 | Cowan | |
| 2008/0126344 A1 | 5/2008 | Hoffman et al. | |
| 2011/0046969 A1 | 2/2011 | Carlson et al. | |
| 2011/0131122 A1* | 6/2011 | Griffin | G06Q 40/08 |
| | | | 705/35 |
| 2014/0114840 A1 | 4/2014 | Arnold et al. | |
| 2015/0193774 A1* | 7/2015 | Wetzel | G06Q 50/01 |
| | | | 705/44 |
| 2015/0348042 A1* | 12/2015 | Jivraj | G06Q 20/322 |
| | | | 705/44 |
| 2016/0328814 A1* | 11/2016 | Prichard | G06Q 50/265 |
| 2017/0148025 A1* | 5/2017 | Le | G06Q 20/401 |
| 2019/0087821 A1 | 3/2019 | Jia et al. | |
| 2019/0236607 A1* | 8/2019 | Formsma | G06N 20/20 |

OTHER PUBLICATIONS

"Gurucul Fraud Analytics", Retrieved From https://web.archive.org/web/20180402235828/https:/gurucul.com/products/fraud-analytics, Apr. 2, 2018, 6 Pages.

"International Search Report and Written Opinion Issued in PCT Application No. PCT/US20/038271", dated Sep. 23, 2020, 12 Pages.

* cited by examiner

KNOWLEDGE NEIGHBOURHOODS FOR EVALUATING BUSINESS EVENTS

CROSS-REFERENCE TO RELATED APPLICATIONS

This application claims the benefit of and priority to U.S. Provisional Patent Application Ser. No. 62/908,265 filed on Sep. 30, 2019 and entitled "KNOWLEDGE NEIGHBOURHOODS FOR EVALUATING BUSINESS EVENTS," which application is expressly incorporated herein by reference in its entirety.

BACKGROUND

Computer systems and related technology affect many aspects of society. Indeed, the computer system's ability to process information has transformed the way we live and work. Computer systems now commonly perform a host of tasks (e.g., word processing, scheduling, accounting, etc.) that prior to the advent of the computer system were performed manually. More recently, computer systems have been, and are being, developed in all shapes and sizes with varying capabilities. As such, many individuals and families alike have begun using multiple computer systems throughout a given day.

For instance, computer systems are now used in ecommerce and the like as individuals increasing perform financial transactions such as making a purchase from various vendors over the Internet. In order to perform the financial transactions, the individuals are typically required to provide a payment instrument such as a credit card or bank account information such as a checking account to the vendor over the Internet. The vendor then uses the payment instrument to complete the transaction.

The process of providing the payment instrument over the Internet leaves the various merchants subject to loss from fraudulent transactions. For example, when a fraudulent payment instrument is used to purchase a product, the merchants often loses the costs associated with the product. This is often because the bank or financial institution that issues the payment instrument holds the merchants responsible for the loss since it was the merchants who approved the transaction at the point of sale where payment instrument is not present.

To mitigate exposure to such risks, some merchants rely on risk scores that are generated for new transactions, and which are used by the merchants to determine whether they are willing to accept the risks associated with the transactions being potentially fraudulent. If the risk score is too high, the merchant may reject the transaction. Alternatively, if the risk score is low, the merchant is likely to approve the transaction. Such decisions may also include communications with the customer to provide information for satisfying a CVV (Card Verification Value) challenge or a SMS challenge, for example. Additionally, in some instances, a customer may be required to provide additional information to satisfy a CVV (Card Verification Value) challenge or a SMS challenge, etc.

Some merchants generate risk scores themselves, based on the transaction histories of the entities performing the transactions. However, when a merchant generates a risk score themselves and/or when a risk scoring system otherwise relies on only very limited sets of relevant data, it is possible that the risk scores will be somewhat inaccurate relative to the actual risk potential for new transactions. This can be particularly problematic for the merchants that rely significantly on their own risk scores when determining whether to approve or deny the transactions.

For instance, when a risk score generated for a particular transaction is lower than it should be, the merchant may be induced to approve the transaction, even though that transaction may be very risky and fraudulent when considering other factors that the merchant is unaware of. Alternatively, when a risk score generated for a particular transaction is higher than it should be, the merchant may be inclined to deny the transaction, erroneously believing the transaction is fraudulent, even though it isn't. This scenario be particularly distressing for a customer and can often lead to consumer dissatisfaction and a potential loss of consumer business for the merchant.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

This Summary is provided to introduce a selection of concepts in a simplified form that are further described below in the Detailed Description. This Summary is not intended to limit the scope of the invention to only the features included in the Summary.

Disclosed embodiments include systems, methods and devices for determining a risk score for one or more data transactions by traversing different hierarchical levels associated with a plurality of known transaction records associated with a plurality of different entities. In some instances, the disclosed embodiments can be used improve the manner and precision in which computing systems are able to identify and utilize relevant information for determining risk scores to be used for approving or denying the related transactions. In some instances, the application of the disclosed embodiments can improve accuracy in predicting actual risk associated with transactions, leading to fewer false positive and false negative results for transactions that are denied/approved, relative to systems that do not employ the currently disclosed embodiments.

In some embodiments, a system performs a method for generating a risk score for a transaction by traversing a plurality of known data transactions to identify a first set of one or more related entities that are related to the first entity from the plurality of known data transactions based on a first set of one or more attributes in the transaction attributes of the known transactions. These known transactions may be associated with a single merchant or multiple different merchants. This traversing process can be performed for one or more sets of transaction attributes, which may include different hierarchical levels of classification for one or more transaction attribute(s).

A first level entity neighborhood is used to identify a first set of related transactions. A first record of risk information is also created that includes information from the first set of related transactions for the first level neighborhood of entities. When related transactions cannot be found, a generated statistic (e.g., a value of −1, or another value, for instance) can be generated for that level of the entity neighborhood.

Then, for at least one entity in the first level neighborhood of entities, the system identifies a second set of one or more related entities and corresponding transactions from the plurality of recorded data transactions based on a second set of one or more attributes in the transaction attributes, which may be entirely new/different attributes and/or which may be a different hierarchical classification level of the same attribute(s) used for identifying the first level neighborhood entity.

The at least one entity in the first level neighborhood of entities is linked to the second set of one or more related entities, with the second set of entities comprising a defined second level neighborhood of entities which is used to identify a second set of related transactions that includes one or more transactions from the plurality of recorded transactions for each entity in the second level neighborhood of entities. A second record of risk information that includes information from the second set of related transactions for the second level neighborhood of entities is also created.

Additional, levels of neighborhoods of entities (e.g., third, fourth, fifth, or other levels) can also be identified in a similar manner to generate corresponding additional records of risk information by using different hierarchical levels of the attributes for the transactions to identify related entities.

Additional records of risk information can also be obtained by traversing the hierarchical classification levels associated with each entity, based on the entity profile and/or based on attributes of transactions associated with the entity, to identify additional and different transactions that are associated with each entity.

The different records of risk information can be used alone and/or in different combinations to train risk models and/or to generate a risk score for the new transaction and other new transactions to approve or deny the new transaction(s).

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims or may be learned by the practice of the invention as set forth hereinafter.

BRIEF DESCRIPTION OF THE FIGURES

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore considered to be limiting in scope, embodiments will be described and explained with additional specificity and detail through the use of the accompanying drawings in which.

and/or consumer(s), and for generating different risk scores associated with transactions of the entities according to the disclosed embodiments.

DETAILED DESCRIPTION

Figure 1:
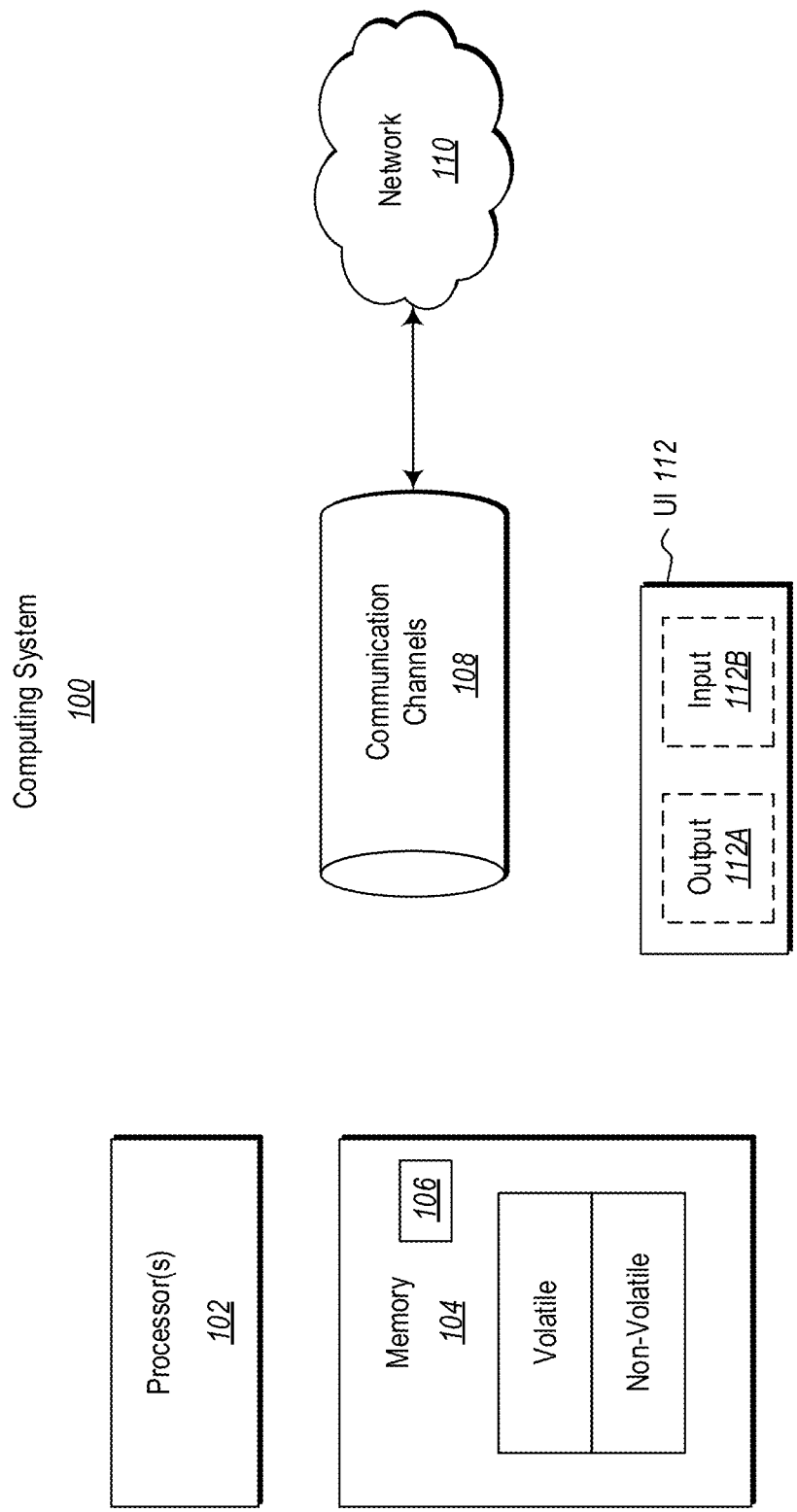
FIG. 1 illustrates a non-limiting example of a computing system which includes, and/or which may be used to implement disclosed embodiments.

Disclosed embodiments include systems, methods and devices for determining a risk score for one or more data transactions by traversing different hierarchical levels associated with a plurality of known transaction records associated with a plurality of different entities.

In some instances, the disclosed embodiments can be used improve the manner and precision in which computing systems are able to identify and utilize relevant information for determining risk scores to be used for approving or denying the related transactions. In some instances, the application of the disclosed embodiments can improve accuracy in predicting actual risk associated with transactions, leading to fewer false positive and false negative results for transactions that are denied/approved, relative to systems that do not employ the currently disclosed embodiments.

In some instances, risk scores are generated by systems that traverse hierarchical classification levels of entities, including classified attribute levels of known transactions, to identify neighborhoods of related entities and related transactions. Corresponding records of transaction information are extracted from or are otherwise generated from neighborhoods of the related transactions associated with the defined neighborhoods of entities/transactions. These records of transaction information are then used by a consortium risk engine to generate composite risk scores associated with information from multiple merchants/entities and that were only identified by traversing the hierarchical classification of the entities and/or the corresponding transactions, which are at least tangentially related to the new transaction(s), and which may be the basis for approving or denying the new transactions.

In some embodiments, entity profiles and transaction profiles are created and stored for a plurality of different entities and transactions, and which are based on machine learning models and/or which are used to train the models with supervised learning (for example). The generated profiles, which may be associated with one or more attributes that are associated with information about any particular data transaction(s) and/or associated entities involved in the transaction(s) include risk information that is indicative of a level of fraud that is occurring in the data transactions. These profiles may be used as an input into the risk determination models so that the risk determination models are able to account for changes in any fraudulent activity.

In some embodiments, one or more current data transactions that are associated with one or more current attributes are received. One or more stored or known data transactions having identifiable attributes are accessed. One or more of these attributes are selected and used to identify related transactions and/or entities at a plurality of different hierarchical levels associated with the attributes, as will be described in more detail below.

Risk information for the identified/related transactions is determined and provided in one or more records. These records and/or risk information is stored and/or used to generate risk scores associated with the known and related transactions and/or new and related transactions. For instance, risk scores can be generated by analyzing statistics of the current transactions, by evaluating velocity and other statistics calculated in batch mode for the different transactions. The risk scores may be calculated using machine learning algorithms that process and evaluate outputs (e.g., fraudulent transactions and valid transaction determinations) for related/known transactions.

The plurality of transaction attributes, in some embodiments, include one or more of a product type, an email domain, a geographical location, a device type, a billing phone number, a shipping phone number, a billing address, a device IP address, a shipping address, an electronic billing email (e.g., PayPal email), account address, an account phone number, a fuzzy device identifier, an account email, a transaction amount, and/or other transaction attributes.

In some instances, as described herein, transaction attributes (which are used to generate the risk information) are classified/organized according to hierarchical structures of different hierarchical classification levels. For instance, a geographical location attribute may be organized/classified according to hierarchical classification levels such as zip code, city, state, and county. These attributes may also be grouped into sets of attributes that are sometimes referred to, herein, as entities or entity levels. In this regard, it will be appreciated that the entities may also be structured as hierarchical classification levels (e.g., neighborhoods/hubs), being based on the relationships they share with different attributes and/or different attribute classification levels for any given transaction(s).

Records of transaction information may be based on any level of granularity, including from the microgranularity of an entity record of transaction information for a single entity, and/or from the microgranularity of a combined neighborhood record of transaction information for transactions related to each of the entities in the neighborhood.

The records of transaction information may also include direct statistics and other information for the transactions of the entities, as well as indirect statistics and other information for the transactions of additional entities that are determined to be related to the particular entity (or neighborhood of entities) and/or for transactions that are not directly related to the transactions of the particular entity (or neighborhood of entities), but that are indirectly related (e.g., related from a different hierarchical level of the transaction attribute(s)). When there are no related transactions/histories of related transactions for a particular entity, then a base statistic can be created for that level of the entity, such as a value of −1 (or any other predetermined/generated value), to reflect that there are no related transactions/histories for a particular transaction/entity at a given level and that can be used to generated statistics for the entity/transaction.

The risk information included in the generated risk records is indicative of a relative or absolute amount of legitimate transactions associated with a particular entity and/or a relative or absolute amount of fraudulent transactions associated with a particular entity. In this regard, the risk information may reflect a level fraud that may be occurring, and/or a potential risk level of fraud associated with a particular transaction. In some embodiments, the risk information is presented as a numerical value between 0 and 1, or between 0 and 100, or between 0 and 1000, or some other range.

The transaction record may be received/identified from a third party, such as a merchant risk analysis engine and/or may be generated by the system that includes a consortium risk engine for applying a plurality of related and different transaction records/risk information when generating a risk score for a particular transaction that is determined to be at least partially related to entities having attributes used to generate the different transaction records.

In some instances, the transaction attributes in each transaction record are standardized and/or normalized by the record generator so as to facilitate their use in a consumable format by a risk engine to generate one or more risk scores for the known and/or new transaction(s), such as between a value of −1 and 1, other standardizing value ranges can also be used.

These risk scores can then be stored as transaction histories/attributes that are used and/or shared by the computing system and one or more third party systems (e.g., merchants) to deterministically authorize or deny corresponding transactions/entities associated with the risk scores, depending on whether the risk score meets, fails to meet, or exceeds the risk threshold(s) for authorizing or denying the transaction(s). These thresholds may be shared and standard thresholds or unique merchant specific thresholds.

There are various technical effects and benefits that can be achieved by implementing aspects of the disclosed embodiments. By way of example, the disclosed embodiments can be used to further train and calibrate risk models with additional data that has been shown to improve the prediction accuracy of the risk models. Further, the technical effects related to the disclosed embodiments can also include improved user convenience and efficiency gains by providing more accurate risk scores for more appropriately approving and/or rejecting transactions, with fewer false positive rejections and fewer false negative approvals.

Some introductory discussion of a computing system will be described with respect to FIG. 1. Computing systems are now increasingly taking a wide variety of forms. Computing systems may, for example, be handheld devices, appliances, laptop computers, desktop computers, mainframes, distributed computing systems, datacenters, or even devices that have not conventionally been considered a computing system, such as wearables (e.g., glasses). In this description and in the claims, the term "computing system" is defined broadly as including any device or system (or combination thereof) that includes at least one physical and tangible processor, and a physical and tangible memory capable of having thereon computer-executable instructions that may be executed by a processor. The memory may take any form and may depend on the nature and form of the computing system. A computing system may be distributed over a network environment and may include multiple constituent computing systems.

As illustrated in FIG. 1, in its most basic configuration, a computing system 100 typically includes at least one hardware processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well.

The computing system 100 also has thereon multiple structures often referred to as an "executable component". For instance, the memory 104 of the computing system 100 is illustrated as including executable component 106. The term "executable component" is the name for a structure that is well understood to one of ordinary skill in the art in the field of computing as being a structure that can be software, hardware, or a combination thereof. For instance, when implemented in software, one of ordinary skill in the art would understand that the structure of an executable component may include software objects, routines, methods, and so forth, that may be executed on the computing system, whether such an executable component exists in the heap of a computing system, or whether the executable component exists on computer-readable storage media.

In such a case, one of ordinary skill in the art will recognize that the structure of the executable component exists on a computer-readable medium such that, when interpreted by one or more processors of a computing system (e.g., by a processor thread), the computing system is caused to perform a function. Such structure may be computer-readable directly by the processors (as is the case if the executable component were binary). Alternatively, the structure may be structured to be interpretable and/or compiled (whether in a single stage or in multiple stages) so as to generate such binary that is directly interpretable by the processors. Such an understanding of example structures of an executable component is well within the understanding of one of ordinary skill in the art of computing when using the term "executable component".

The term "executable component" is also well understood by one of ordinary skill as including structures that are implemented exclusively or near-exclusively in hardware, such as within a field programmable gate array (FPGA), an application specific integrated circuit (ASIC), or any other specialized circuit. Accordingly, the term "executable component" is a term for a structure that is well understood by those of ordinary skill in the art of computing, whether implemented in software, hardware, or a combination. In this description, the terms "component", "agent", "manager", "service", "engine", "module", "virtual machine" or the like may also be used. As used in this description and in the case, these terms (whether expressed with or without a modifying clause) are also intended to be synonymous with the term "executable component", and thus also have a structure that is well understood by those of ordinary skill in the art of computing.

In the description that follows, embodiments are described with reference to acts that are performed by one or more computing systems. If such acts are implemented in software, one or more processors (of the associated computing system that performs the act) direct the operation of the computing system in response to having executed computer-executable instructions that constitute an executable component. For example, such computer-executable instructions may be embodied on one or more computer-readable media that form a computer program product. An example of such an operation involves the manipulation of data.

The computer-executable instructions (and the manipulated data) may be stored in the memory 104 of the computing system 100. Computing system 100 may also contain communication channels 108 that allow the computing system 100 to communicate with other computing systems over, for example, network 110.

While not all computing systems require a user interface, in some embodiments, the computing system 100 includes a user interface system 112 for use in interfacing with a user. The user interface system 112 may include output mechanisms 112A as well as input mechanisms 112B. The principles described herein are not limited to the precise output mechanisms 112A or input mechanisms 112B as such will depend on the nature of the device. However, output mechanisms 112A might include, for instance, speakers, displays, tactile output, holograms and so forth. Examples of input mechanisms 112B might include, for instance, microphones, touchscreens, holograms, cameras, keyboards, mouse of other pointer input, sensors of any type, and so forth.

Embodiments described herein may comprise or utilize a special purpose or general-purpose computing system including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computing system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: storage media and transmission media.

Computer-readable hardware storage devices or media include RAM, ROM, EEPROM, CD-ROM or other optical disk storage, magnetic disk storage or other magnetic storage devices, or any other physical and tangible storage medium which can be used to store desired program code means in the form of computer-executable instructions or data structures and which can be accessed by a general purpose or special purpose computing system.

A "network" is defined as one or more data links that enable the transport of electronic data between computing systems and/or modules and/or other electronic devices. When information is transferred or provided over a network or another communications connection (either hardwired, wireless, or a combination of hardwired or wireless) to a computing system, the computing system properly views the connection as a transmission medium. Transmissions media can include a network and/or data links which can be used to carry desired program code means in the form of computer-executable instructions or data structures and which can be accessed by a general purpose or special purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RAM within a network interface module (e.g., a "NIC"), and then eventually transferred to computing system RAM and/or to less volatile storage media at a computing system.

Computer-executable instructions comprise, for example, instructions and data which, when executed at a processor, cause a general-purpose computing system, special purpose computing system, or special purpose processing device to perform a certain function or group of functions. Alternatively, or in addition, the computer-executable instructions may configure the computing system to perform a certain function or group of functions. The computer executable instructions may be, for example, binaries or even instructions that undergo some translation (such as compilation) before direct execution by the processors, such as intermediate format instructions such as assembly language, or even source code.

Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computing system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, datacenters, wearables (such as glasses) and the like. The invention may also be practiced in distributed system environments where local and remote computing systems, which are linked (either by hardwired data links, wireless data links, or by a combination of hardwired and wireless data links) through a network, both perform tasks. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

Figure 2:
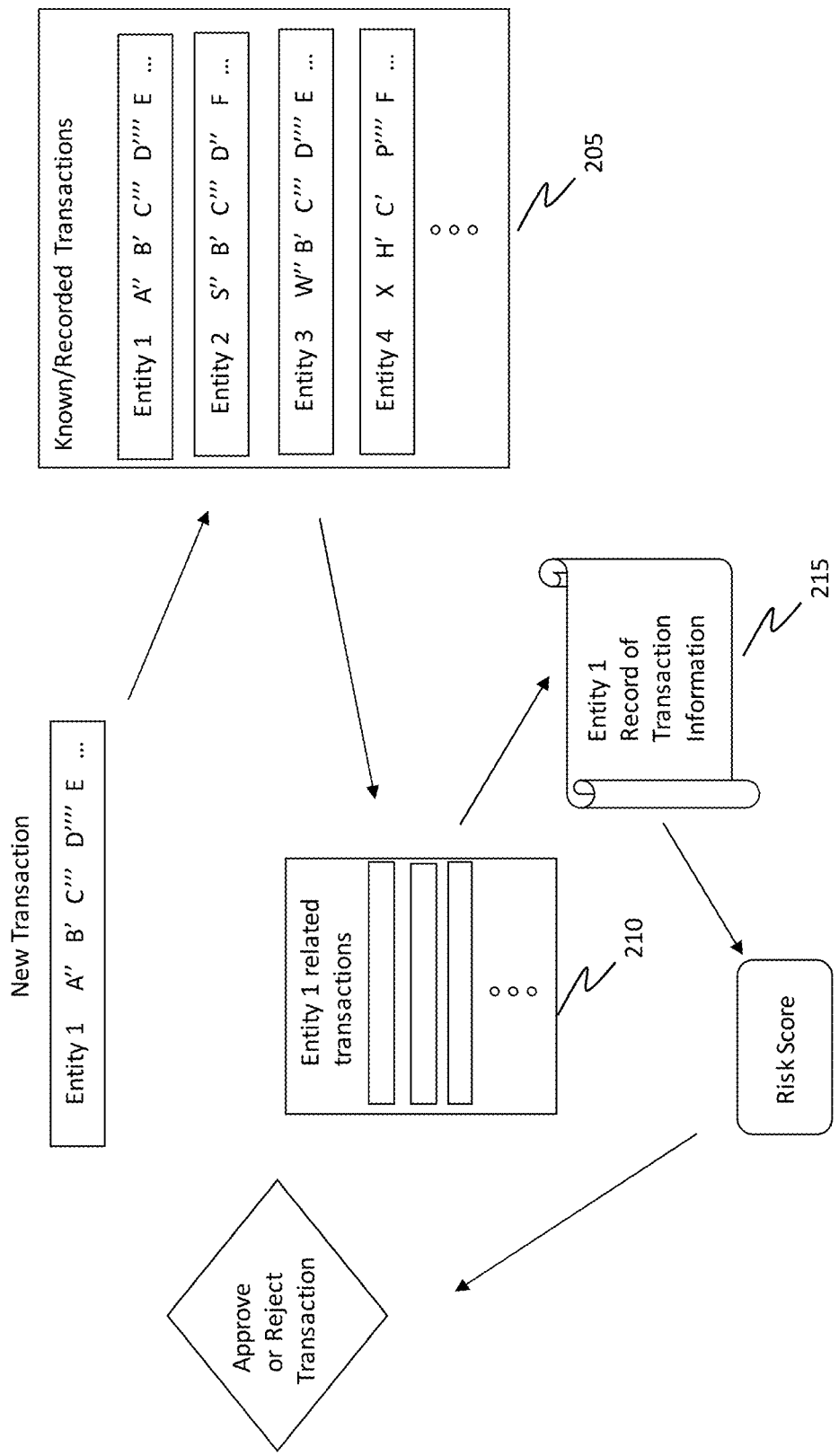
FIG. 2 illustrates a non-limiting example of a block diagram of components and processing flows associated with disclosed embodiments and which includes the generation of a risk score based on an entity record of transaction information associated with historical transactions of the entity.
Figure 3:
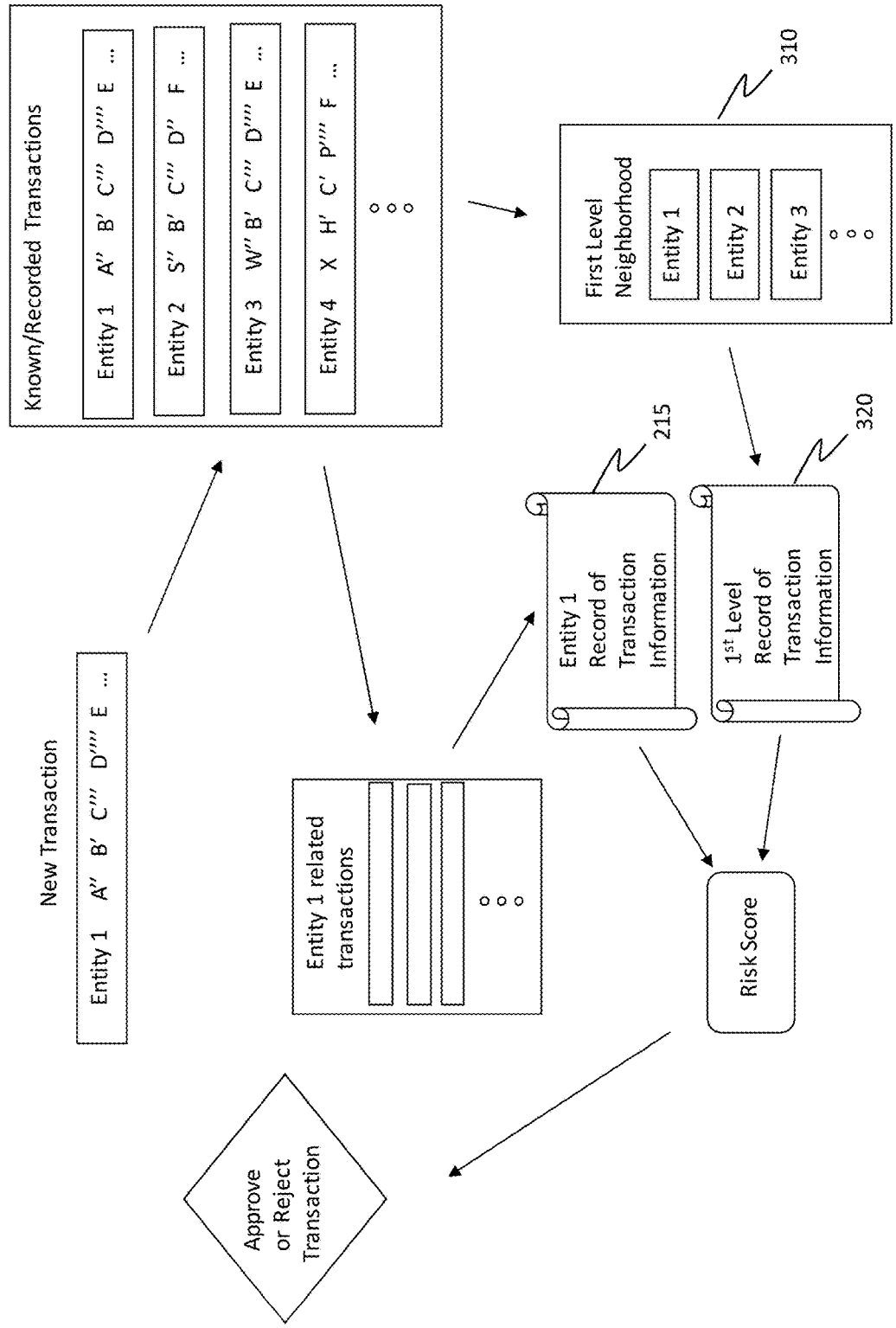
FIG. 3 illustrates a non-limiting example of a block diagram of components and processing flows associated with disclosed embodiments and which includes the generation of a risk score for a particular entity or associated transaction that is (1) based on at least a first level neighborhood record of transaction information associated with transactions of a plurality of entities included in a defined neighborhood of entities that are determined to be related to the particular entity, and/or (2) based at least in part on an entity record of transaction information associated with historical transactions of the entity, and which includes statistics on how many fraudulent/legitimate transactions are associated with the corresponding entity.
Figure 4:
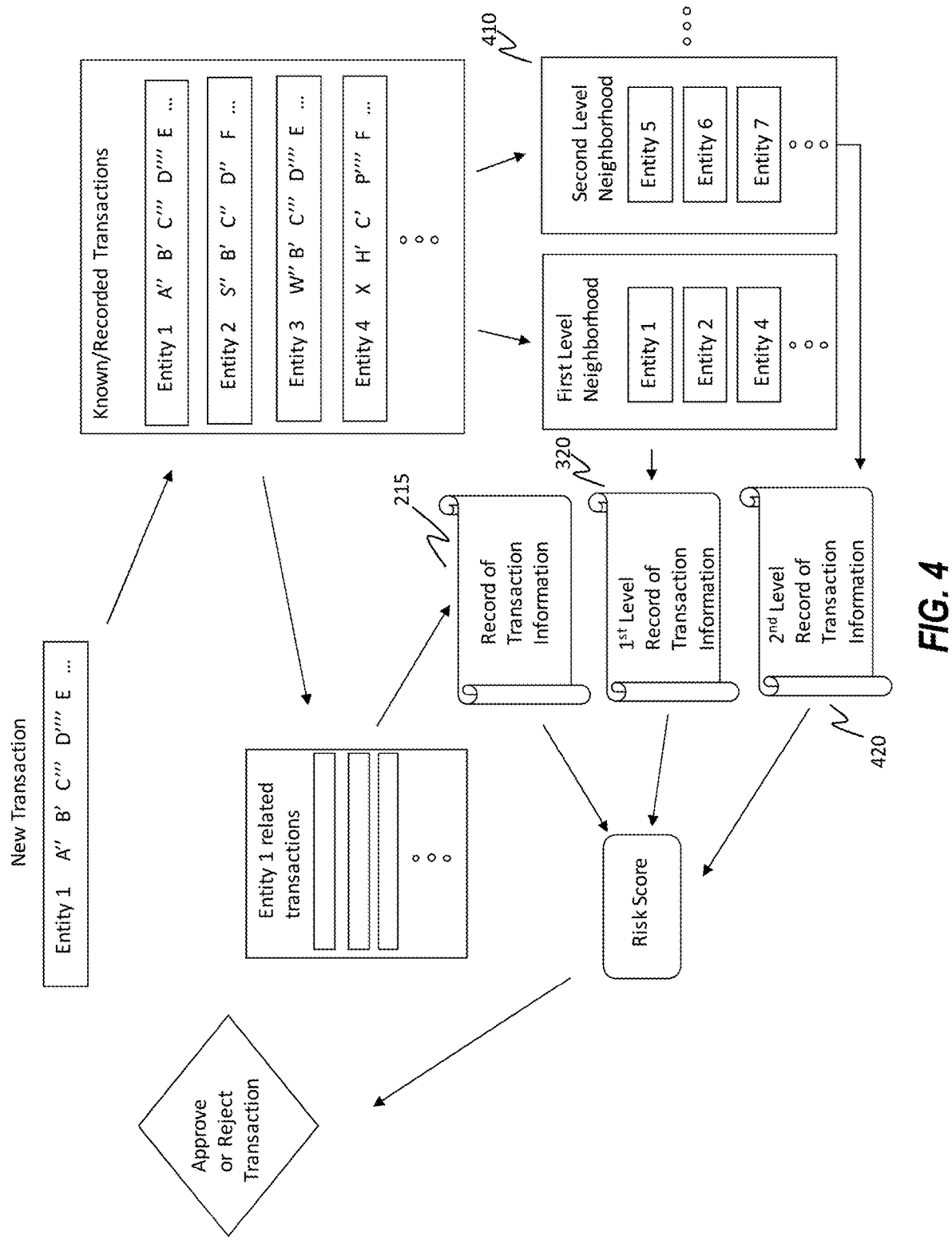
FIG. 4 illustrates a non-limiting example of a block diagram of components and processing flows associated with disclosed embodiments and which includes the generation of a risk score for a particular entity or associated transaction that is (1) based on at least a first level neighborhood record of transaction information associated with transactions of a first hierarchical level and a first plurality of entities included in a first defined neighborhood of entities that are determined to be related to the particular entity, and/or (2) based on at least a second level neighborhood record of transaction information associated with transactions of a second plurality of entities included in a defined second neighborhood of entities that are determined to be related to a different hierarchical scope of the particular entity than the first hierarchical level and/or (3) based at least in part on an entity record of transaction information associated with historical transactions of the entity.

Attention is now directed to FIGS. 2-4, which illustrate examples of different components and processing flows associated with disclosed embodiments for generating risk scores for a particular entity or associated transaction that are (1) based on at least a first level neighborhood record of transaction information associated with transactions of a first hierarchical level and a first plurality of entities included in a first defined neighborhood of entities that are determined to be related to the particular entity, and/or (2) based on at least a second level neighborhood record of transaction information associated with transactions of a second plurality of entities included in a defined second neighborhood of entities that are determined to be related to a different hierarchical scope of the particular entity than the first hierarchical level and/or (3) based at least in part on an entity record of transaction information associated with historical transactions of the entity.

For instance, as shown, a new transaction may be received, with multiple different attributes. These attributes are visually identified as characters (e.g., A" B' C'" D"" E . . . ) and may include any of the attributes previously mentioned (e.g., a product type, an email domain, a geographical location, a device type, a billing phone number, a shipping phone number, a billing address, a device IP address, a shipping address, an electronic billing email (e.g., PayPal email), account address, an account phone number, a fuzzy device identifier, an account email, a transaction amount, and/or other transaction attributes). In this example, the prime designation (') is used to reflect different hierarchical level classification for similar attributes having the same character.

For instance, if the character A corresponded to a geography, the A"" designation may refer to a specific street address, while A'" may refer to a zip code, and A" may refer to a city, A' may refer to a state and A may refer to a country, for example. Likewise, if D corresponded to the IP address attribute, then D"" might comprise an IP address with four values (e.g., 208.173.120.34), whereas D'" might comprise an IP address scope of a higher domain, such as (e.g., 208.173.120), whereas D" might correspond to an even higher IP address domain scope (e.g., 208.173), and so forth.

This set of examples is provided to illustrate that different known/recorded transactions for particular entities may include different attributes that are related or relatable to each other differently, at different granularities/hierarchical classification levels for the different attributes of the entities. These attributes may also be used (at the different hierarchical classification levels) to identify neighborhoods of related transactions/entities, and which may be used to generate corresponding records of transaction information and corresponding risk scores.

For instance, as shown in FIG. 2, the known transactions (205) can be traversed at a first level to identify all transactions (210) associated directly with a particular entity (e.g., entity 1) based on a set of one or more attributes of the entity (e.g., B'). This set of all transactions (210) may be used to generate a record of transaction information (215) by using one or more risk model(s) that associate risk information with the different transaction attributes to reflect a relative level of fraud associated with the related transactions and which may correspond with the new transaction. This record of transaction information may then be used to generate a risk score that is used to approve or reject and/or to trigger a manual review for a related transaction, such as the new transaction.

FIG. 3 identifies a relates set of components and flows, except in this illustration, a neighborhood of related entities 310 is identified, which includes a plurality of different entities from the known/recorded entities that are determined to be related to each other and/or to the first entity according to a first set of one or more attributes at a same level or a different level that was used to generate the list of related transactions 210 (e.g., C'"). The first set of one or more attributes defines the scope of the neighborhood 310, which includes all entities matching or being substantially similar to the first set of attributes.

As also shown, a new record of transaction information 320 may be generated for the transactions included in the first level neighborhood 310 which reflects a relative level of fraud associated with the transactions related to the new transaction and which is used alone and/or in combination with the entity record of transaction information to generate a combined risk score. This combined or consortium risk score is more accurate than the risk score of FIG. 2, because it is based on more related information associated with the new transaction. To avoid skewing a risk score based on unrelated information, the system may weight transaction information more heavily that is more closely related to the same hierarchical levels of the new transaction than those that are more distantly related.

FIG. 4 is similar, but further includes another level neighborhood (e.g., second level neighborhood 410) that is identified as being related to the new transaction, based on analyzing the known/recorded transactions in view of relationships to a second set of one or more attributes that is different than the first set of one or more attributes, and which may include the same attributes at different hierarchical classification levels (e.g., attribute C', which is a different attribute hierarchical level than the C'" used for the first level neighborhood). This new neighborhood 410 is further used to generate a $2^{nd}$ Level Record of Transaction Information 420 that is used alone and/or in combination with one or more of the $1^{st}$ Level Record of Transaction Information 320 and/or the Record of Transaction Information 215 to generate a corresponding risk score.

Figure 5:
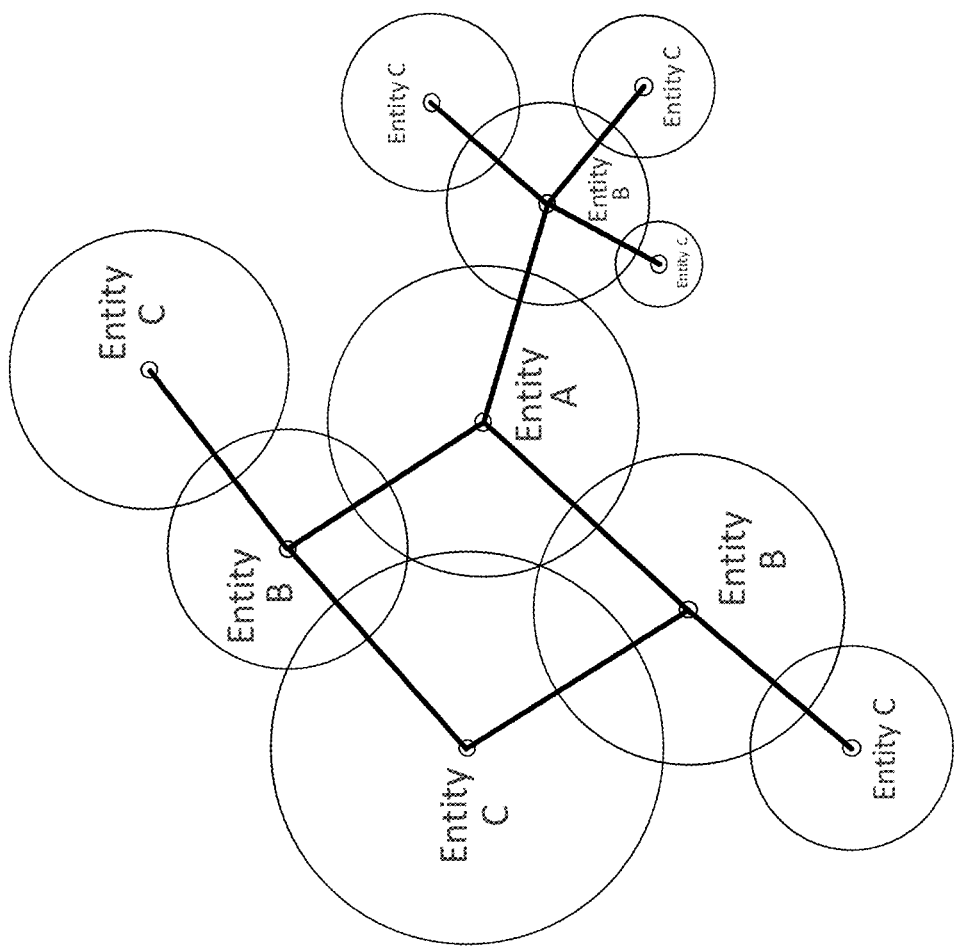
FIG. 5 illustrates a visual overview of different entities and their non-limiting examples of relationships defined as neighborhoods or hubs, based on their different hierarchical levels of relationship to each other.

FIG. 5 illustrates a visual overview of different entities and their non-limiting examples of relationships defined as neighborhoods or hubs, based on their different hierarchical levels of relationship to each other. For instance, as shown, there are different entities that are grouped into hubs that are interrelated and that collectively form a neighborhood of a plurality of different interrelated hubs. Even more particularly, as shown, a first entity (Entity A) is linked to a set of one or more second entities (Entity B's). This relationship may be based, for example, on the historical data of Entity A and a correlation in an attribute of Entity A's historical data with a corresponding attribute of the second level entities (e.g., Entity B's). Then, Entity B's historical data can be aggregated to generate profiles, such as Good Transaction Rate, Bad Transaction Rate, Chargeback Rate, Refund Rate, etc., which correspond with a similar profile associated with Entity A.

Likewise, a third level of entities (e.g., Entity's C) can be linked to the second of entities (Entity B's) by attribute and/or similar profiles that are common between the two sets of entities. Each grouping of entities that are related by a particular attribute and/or profile label can be defined as a separate hub or neighborhood of entities. The edges that are shown to connect the different entities comprise the relationship definition that links the entities. For instance, the lines/edges between Entity A and Entity Bs can visualize a defined attribute and/or profile relationship that is common between the entities. Different lines having different textures/visual properties may comprise different attributes/profile labels.

Although not shown, the disclosed embodiments also include interfaces, such as user interfaces (UI) that enable a user to select a group of entities and to visually generate and render an image, such as shown, that visualizes the relationships between different entities, with different edges (e.g., having colors, sizes, textures and/or types of edge lines) representing different attributes and/or different profiles. The sizes of the entities may also reflect a relative strength or magnitude of a particular entity profile (e.g., good or bad transaction rating and so forth). Alternatively, the sizes of the entities can reflect a particular presence or magnitude of another attribute than the one used to define the edges, and such that different attributes can be simultaneously visualized on the interface with the different interrelated entities. Additionally, different entity shapes, colors and/or other visually distinguishing elements can be used to visualize different attributes that are associated with the different entities. A legend can also be presented to indicate the value of the different sizes, colors, textures of the different entity shapes and edges.

The disclosed embodiments include parsing and analyzing the attributes of the different entities to generate and render such a visualization, as reflected in FIG. 5, and to reflect the interrelationship of the entities based on the different attributes and to correlate/group the entities into defined hubs/neighborhoods.

The disclosed embodiments also include using the defined neighborhoods/hubs based on interrelationships (as shown in FIG. 5) to generate corresponding records of transaction information, such as one transaction record for each hub or, alternatively, a single transaction record based on information for all entities in the entire neighborhood of two or more interrelated hubs. The transaction records can then be used to generate or supplement information used to generate a risk score for a particular entity in the neighborhood.

Figure 6:
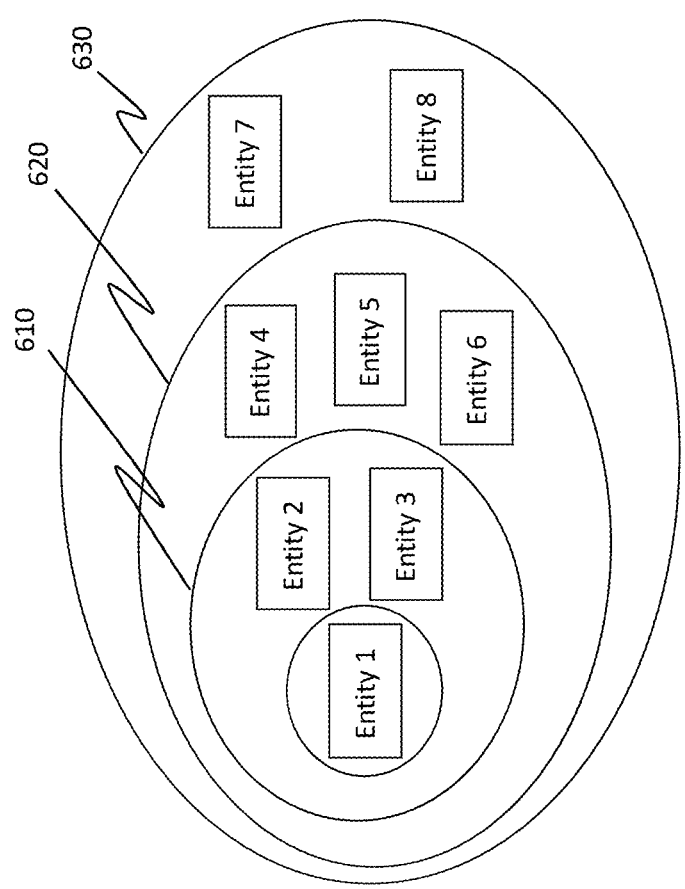
FIG. 6 illustrates non-limiting examples of entity and/or transaction attributes and hierarchy classification information that can be used to classify/define different neighborhoods/hubs for entities and transactions.

FIG. 6 illustrates non-limiting examples of entity and/or transaction attributes and hierarchy classification information that can be used to classify/define different neighborhoods/hubs for entities and transactions. In this example, a first set of entities are related according to a first neighborhood/hub 610 with a scope defined for a set of one or more entity attributes at a first level and a second set of entities are related according to a first neighborhood/hub 620 with a scope defined for a second set of one or more second entity attributes at a first level and/or the first set of one or more entity attributes at a second hierarchical level. There is also a third set of entities are related according to a first neighborhood/hub 630 with a scope defined for a third set of one or more second entity attributes at a first level and/or the first set of one or more entity attributes at a third hierarchical level. The various sets of one or more attributes may be any attribute(s), including entity identifier, domain, location, phone number, email, account designation, transaction amount and/or other attribute.

Figure 7:
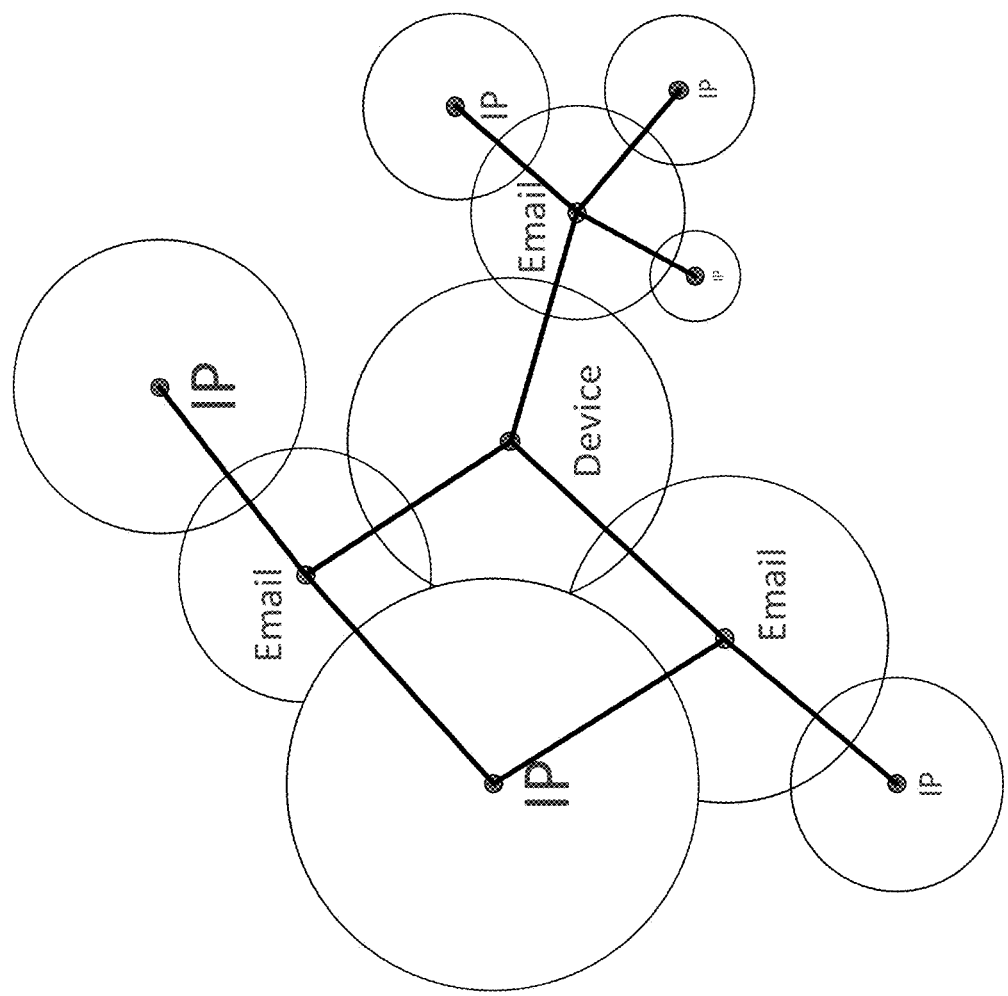
FIG. 7 illustrates another non-limiting example of entity/transaction relationships defined as neighborhoods or hubs, based on different hierarchical levels of relationship existing between different entities and/or transactions.

FIG. 7 illustrates another non-limiting example of entity/transaction relationships defined as neighborhoods or hubs, based on different hierarchical levels of relationship existing between different entities and/or transactions, which include links established between different levels and entities/transactions based on attributes.

This is similar to the visualization presented in reference to FIG. 5. However, instead of visualizing the different entities and their relationships, a relationship graphic can be generated to show interrelationships in attributes of different transaction profiles at different levels. For instance, a first device attribute for a particular transaction is identified as being related to other transactions using a particular email account or set of different email accounts at a first level. Then, each email account that is used is linked to different IP addresses used to host and/or transmit messages to the corresponding email account. In this manner, different IP addresses can be found to be related to a particular device in an extended and linked hub/neighborhood of defined attributes associated with the device, email account(s) and IP addresses related to a particular transaction (even through inference or extended relationship definitions). Even more particularly, the email attribute can be used to identify/define a scope of a neighborhood of transactions/entities that are related, then the statistics like fraud rate based on the fraud labels received so far, fraud dollar amount, total number of transactions, etc. will be calculated and then all these statistics will be appended to new incoming transactions associated with the same device and then these appended transaction are used to generate a corresponding record of transaction information for generating corresponding risk scores for all transactions related to the device as primary or secondary stats. Likewise, the email address can be used to link to different IP addresses (when they are associated with the same transactions) used by the email for creating links and defining a neighborhood/hub of IP addresses for each email and which can also be used to generate corresponding records of transaction information (one for each email hub). Alternatively, they can all be considered together for generating a single record of transaction information that is also used to supplement the information used to generate the risk score for transactions related to the device.

Figure 8:
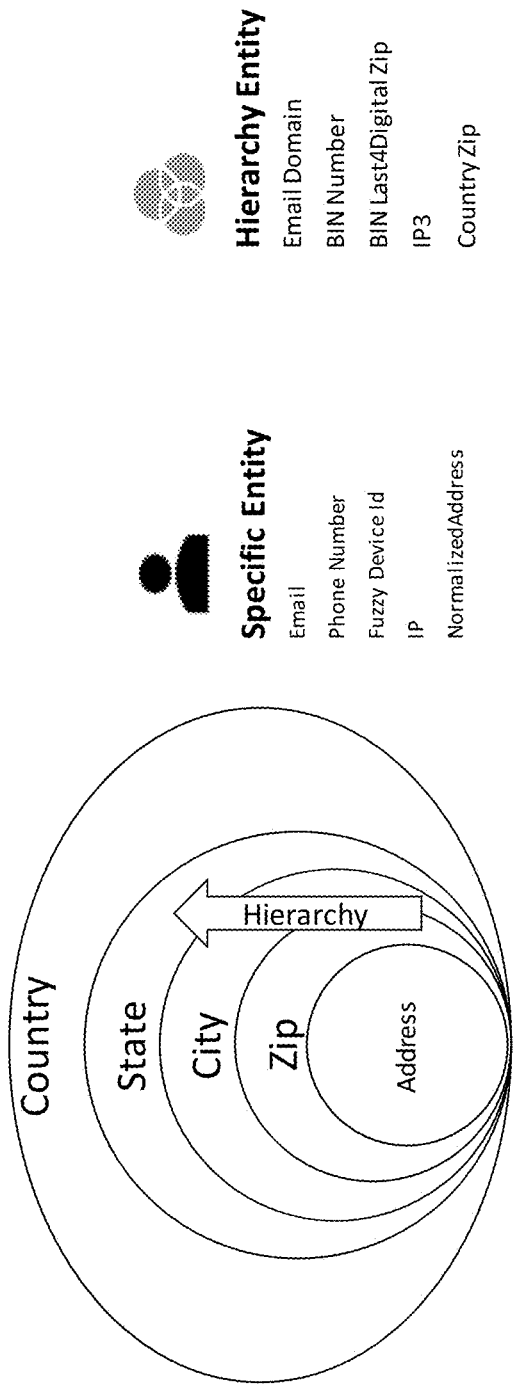
FIG. 8 illustrates another non-limiting example of a visual overview and description of different entities/transactions and hierarchical information that can be used to define neighborhoods of the entities/transactions, based on their hierarchical relationship(s) to each of the entities.

FIG. 8 illustrates another non-limiting example of a visual overview and description of different entities/transactions and hierarchical information that can be used to define neighborhoods or hubs of the entities/transactions, based on their relationship(s) to each other, in which a hierarchy for location attributes may include Address at a first level, Zip at a second level, City at a third level, State at a fourth level and Country at a fifth hierarchical classification level of the location attribute. These different levels of location attributes may be used to scale the scope of the attribute for identifying transactions associated with a particular neighborhood/hub of related entities/transactions.

It will be appreciated that entities can be defined in different ways and can correspond to different entity types, as reflected by the different entity identifiers shown in FIG. 8. For instance, an entities can be classified by their email, phone number, device ID, IP address, normalized geographic address, and/or any other identity identifier attribute. For each entity identifier attribute, an entity can be classified at different levels of that attribute. For instance, for an entity of normalized address, the first level of that entity identifier can be the entity's local street or building address, while the second level is the zip code, the third level is the city, the fourth level is the state and the fifth level is the country.

In another example, the email entity identifier at a first level can be a personal entity email alias, while the second level for that email identifier attribute is the email domain and a third level could be an email service provider, and so forth.

In another example, for the phone number entity identifier, the first level may be the entity cell phone number, while the second level may be the carrier or geographic area code, etc.

By way of yet another example, if the entity is IP, the second level could be IP3, etc. Likewise, for a PI (Payment Instruction) entity, not shown, the first level can be the payment instrument ID, while the second level can be the BIN (Bank ID), and so forth.

It will be appreciated that the different levels of entity identifier attributes may be used to scale the scope of the attribute for identifying transactions associated with a particular neighborhood/hub of related entities/transactions.

Figure 9:
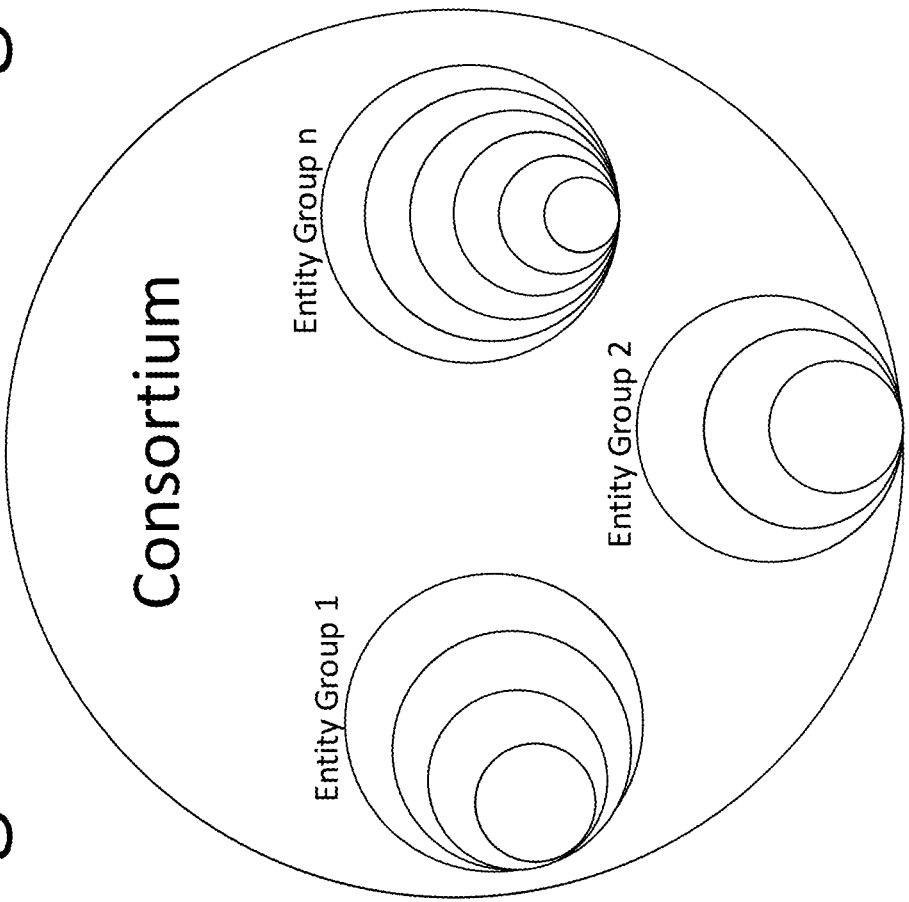
FIG. 9 illustrates another non-limiting example of entity/transaction relationships defined as entity groups, neighborhoods or hubs, based on different hierarchical levels of relationship existing between different entities and/or transactions and in which a consortium is formed for the different entity/transaction groupings.
Figure 9:
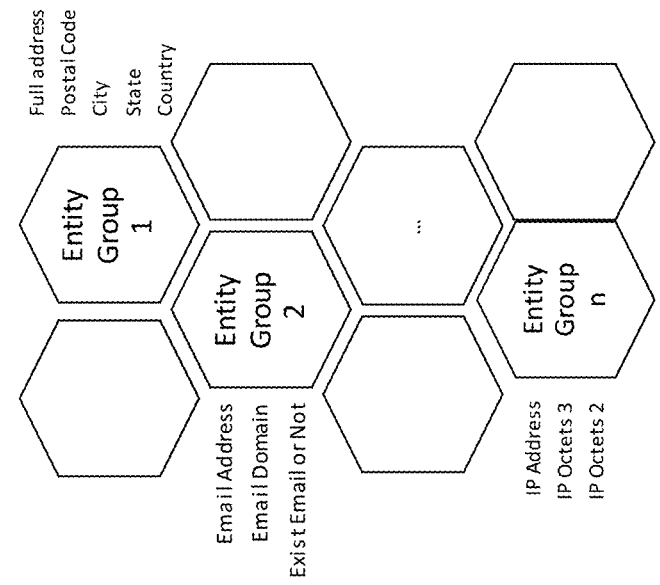

FIG. 9 illustrates another non-limiting example of entity/transaction relationships defined as entity groups, neighborhoods or hubs, based on different hierarchical levels of relationship existing between different entities and/or transactions and in which a consortium is formed for the different entity/transaction groupings. In this example, different entity groups are created as neighborhoods scoped by different sets of transaction/entity attributes. Each entity group is also shown in the consortium as having different hierarchical levels (which can also be referred to as separate sub neighborhoods) and that can be defined for further identifying related transactions that have similar attributes, but at different hierarchical levels of granularity/classification for the particular set of attributes used to define each entity group neighborhood.

Then, the consortium of different neighborhoods is used to train the risk models and to generate risk scores for particular transactions that are determined to be related to the neighborhoods in the consortium by generating and applying the different records of transaction information and corresponding risk information for each classification level sub neighborhood within each entity group neighborhood and/or for each entity group neighborhood.

Figure 10:
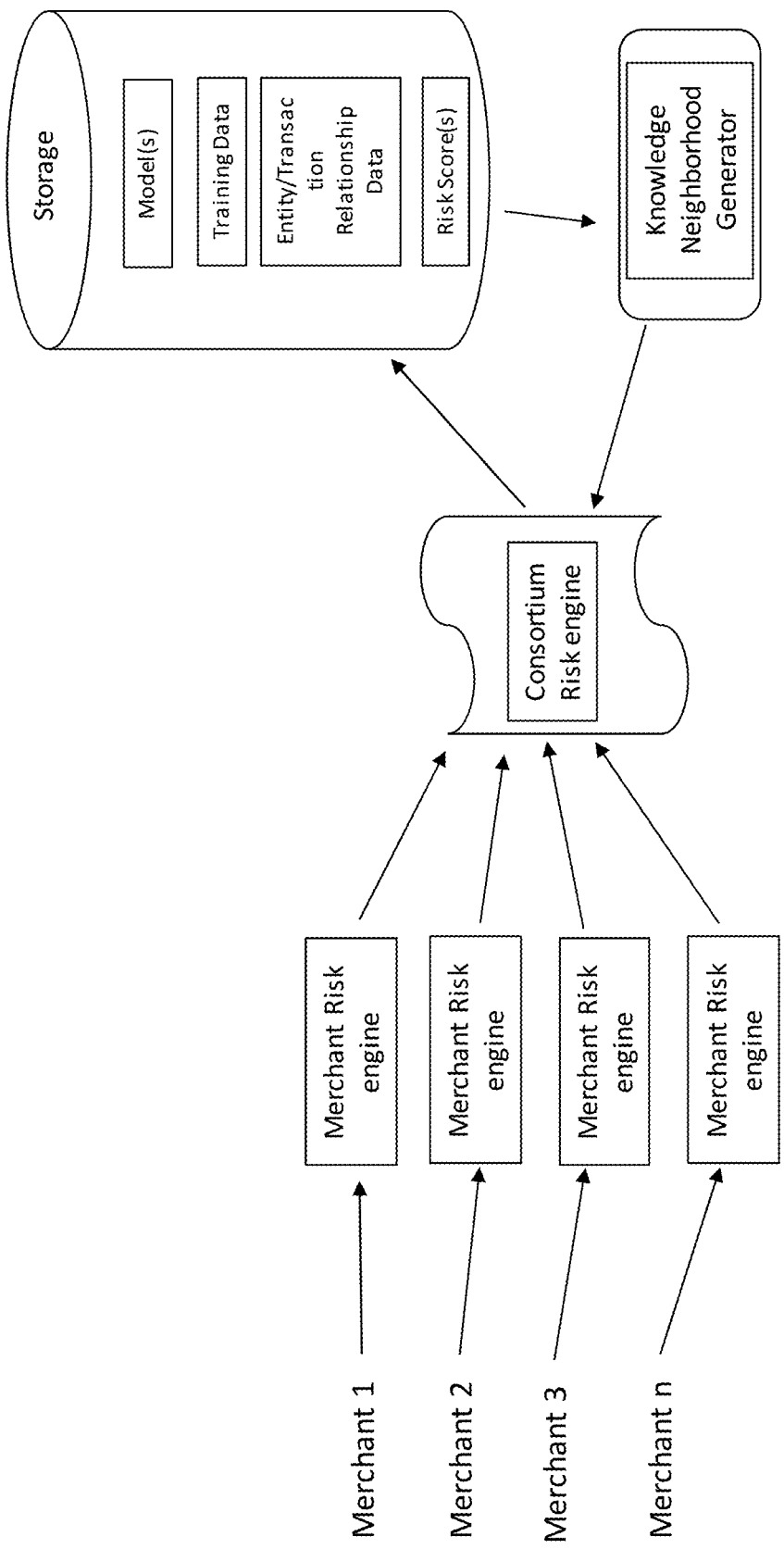
FIG. 10 illustrates an example of a consortium risk engine that receives inputs from a plurality of different risk engines and a knowledge neighborhood generator that is configured to define different entity/transaction relationships based on different hierarchical levels.

FIG. 10 illustrates an example of a consortium risk engine that receives inputs from a plurality of different risk engines and a knowledge neighborhood generator that is configured to define different entity/transaction relationships based on different hierarchical levels. In this illustration, the different merchant risk engines may generate the different records of transaction information and the consortium risk engine uses/applies the various records as training data to further train models (e.g., machine learning models, including but not limited to one or more neural networks, linear or logistic regression models, decision tree models, and so forth).

The system may store these models and the records (e.g., entity and transaction relationship data) which are used by the knowledge neighborhood generator to identify the different neighborhoods that cross-relate transactions from the plurality of different merchants and merchant risk engine records for training the models and for later applying the models to new transaction data to generate risk scores. In this manner, the consortium engine is able to tune and improve the accuracy of the risk models and improve the efficiency and accuracy of generating risk scores (also stored by the system and rendered to a user with one or more user interface (not shown)) by using the risk models that have been more finely tuned. The process of tuning the models can be a dynamic process using supervised and unsupervised learning as an administrator, for example, verifies the analysis of a transaction with the model and/or defines ground truth for the model(s).

Using the foregoing techniques, and by identifying relationships between entities and considering the transaction data of related entities in the analysis of particular transactions, it is possible to improve the performance and accuracy of detecting fraudulent transactions with less false positives by the models that are used to detect the fraud.

Figure 11:
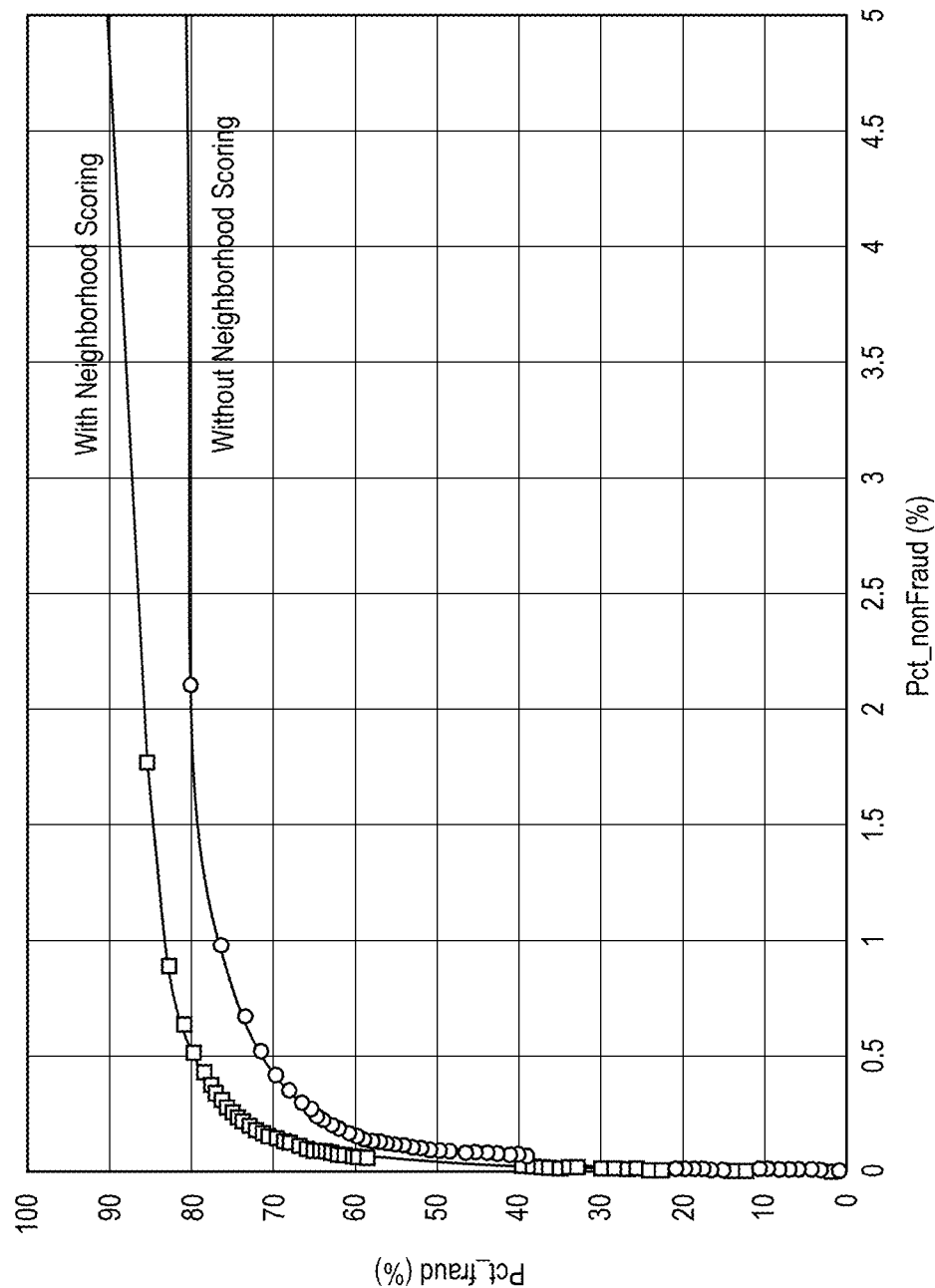
FIG. 11 illustrates a chart that shows an illustration of performance metrics associated with accurately detecting fraudulent transactions by a computing system when employing the disclosed embodiments for generating and utilizing neighborhood "knowledge" of transaction information according to disclosed embodiments, as compared to detecting fraudulent transactions without utilizing neighborhood "knowledge" of transaction information according to the disclosed embodiments.

FIG. 11, for example, illustrates a chart that shows plots of performance metrics that were observed/calculated for detecting fraudulent transactions by a computing system when employing the disclosed embodiments for generating and utilizing neighborhood records of transaction information according to disclosed embodiments, as compared to detecting fraudulent transactions without utilizing neighborhood records of transaction information according to the disclosed embodiments.

Figure 12:
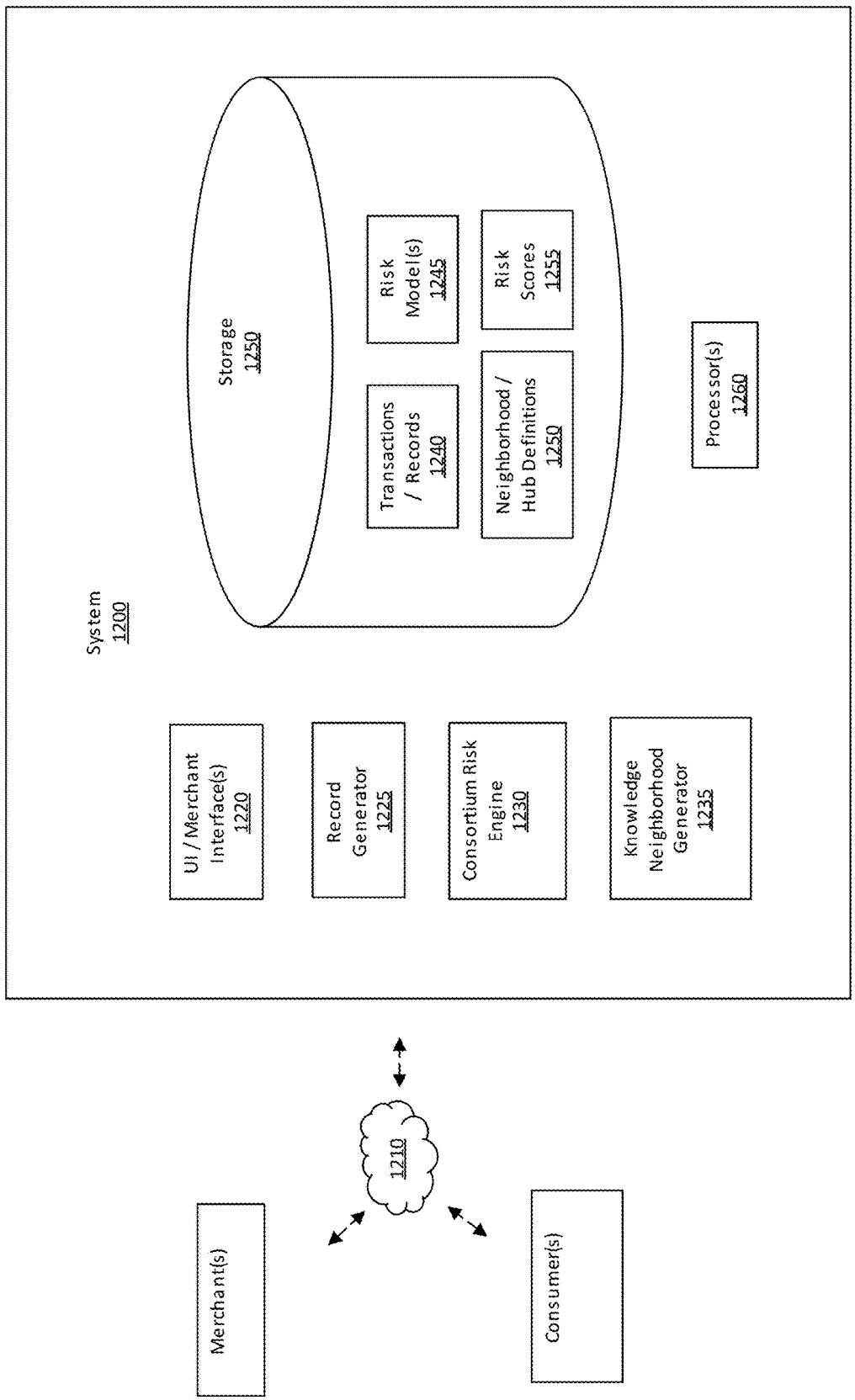
FIG. 12 illustrates an example of a computing system environment in which a system includes various components for interfacing with different entities, including merchant(s)

FIG. 12 illustrates an example of a computing system environment in which a system 1200 includes various components for interfacing with different entities, including merchant(s) and/or consumer(s) through one or more wired and/or wireless networks (1210), and for generating different risk scores associated with transactions of the entities according to the disclosed embodiments.

In this embodiment, the system is configured with one or more interfaces 1220 for interfacing with the different merchant and/or consumers and for facilitating communications between the different system components.

The system also includes a record generator 1225 that is configured to for receiving and storing transactions 1240 and for normalizing the information in the transactions. The record generator 1225 is also configured for using the transaction information in the known/stored transactions for generating different records of transaction information with risk information that is generated by the consortium risk engine, such as for the different neighborhoods of entities identified in the particular neighborhoods.

The consortium risk engine 1230 accesses the transactions and corresponding transaction attributes in defined neighborhoods to generate the different risk information based on definitions in the risk model(s). In some instances, the risk information and transaction attributes are also used to further train and refine the risk model(s).

The knowledge neighborhood generator 1235 also generates/defines the different neighborhoods of entities/transactions by identifying transactions that are related by particular sets of different attributes and/or different hierarchical classification levels of the different attributes.

In some instances, a user interface is used to provide/receive inputs for defining the sets of attributes or scopes of attributes/attribute levels to be used for defining the neighborhoods from the sets of recorded transactions/records 1240 known to the system. The different neighborhoods, once determined are recorded/mapped within the stored neighborhood/hub definitions (1250).

The consortium risk engine 1230 uses the different risk information from the stored records to train the risk model(s) 1245 in combination with other information that is received through the interfaces 1120 that specifies whether particular transactions are ultimately approved or rejected.

In some embodiments, the system may also receive information from an outside evaluator (not shown), such as a bank, credit card provider, or the like that determines that a data transaction that has been approved should have been rejected, or that a rejected transaction should have been approved. This information can be used to provide supervised learning of the risk model(s) 1245.

Figure 13A:
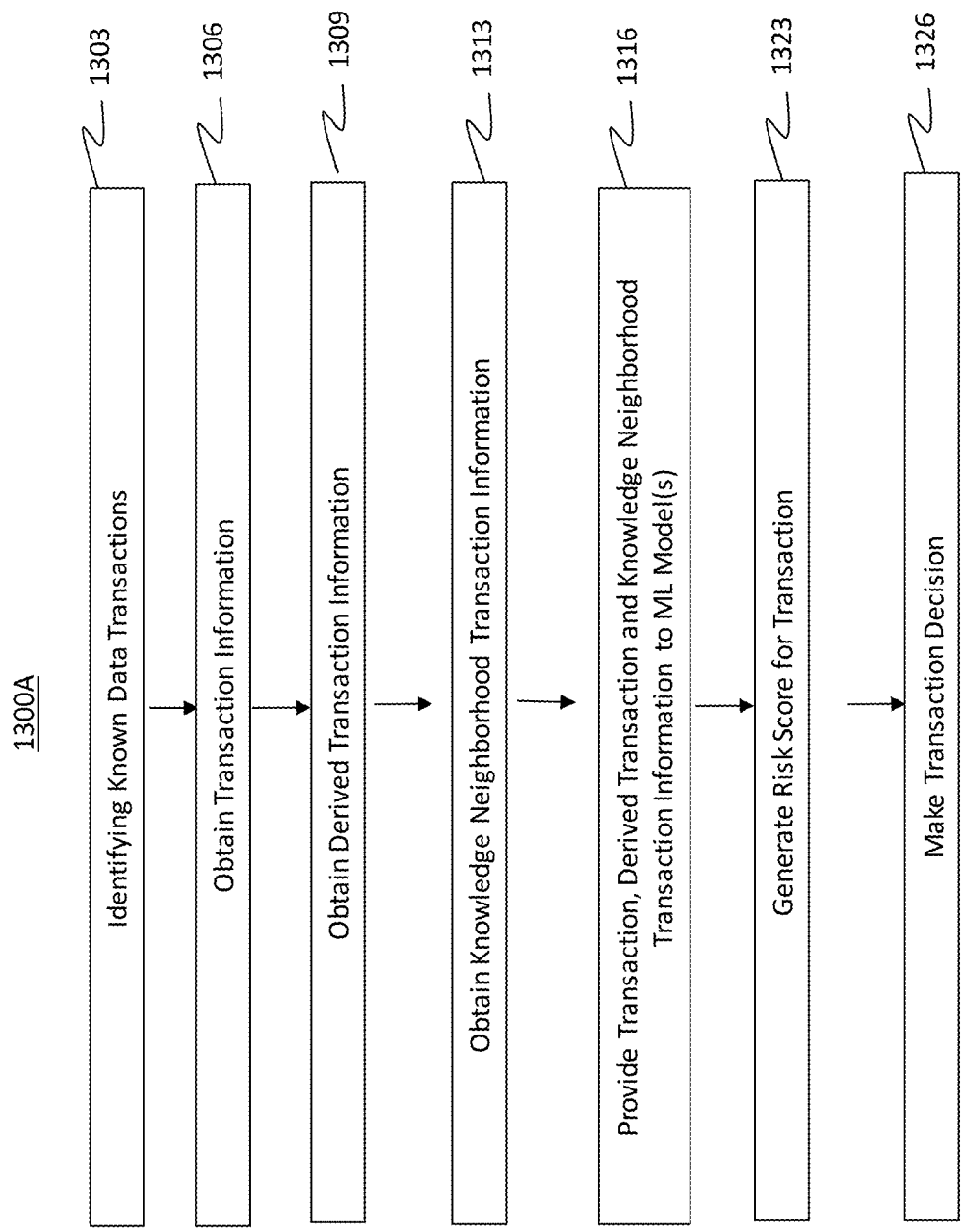
FIGS. 13A-13C illustrate a flow chart of acts associated with methods for generating/determining risk scores for one or more data transactions based on records of risk information associated with neighborhoods/hubs of related entities/transactions according to disclosed embodiments.
Figure 13B:
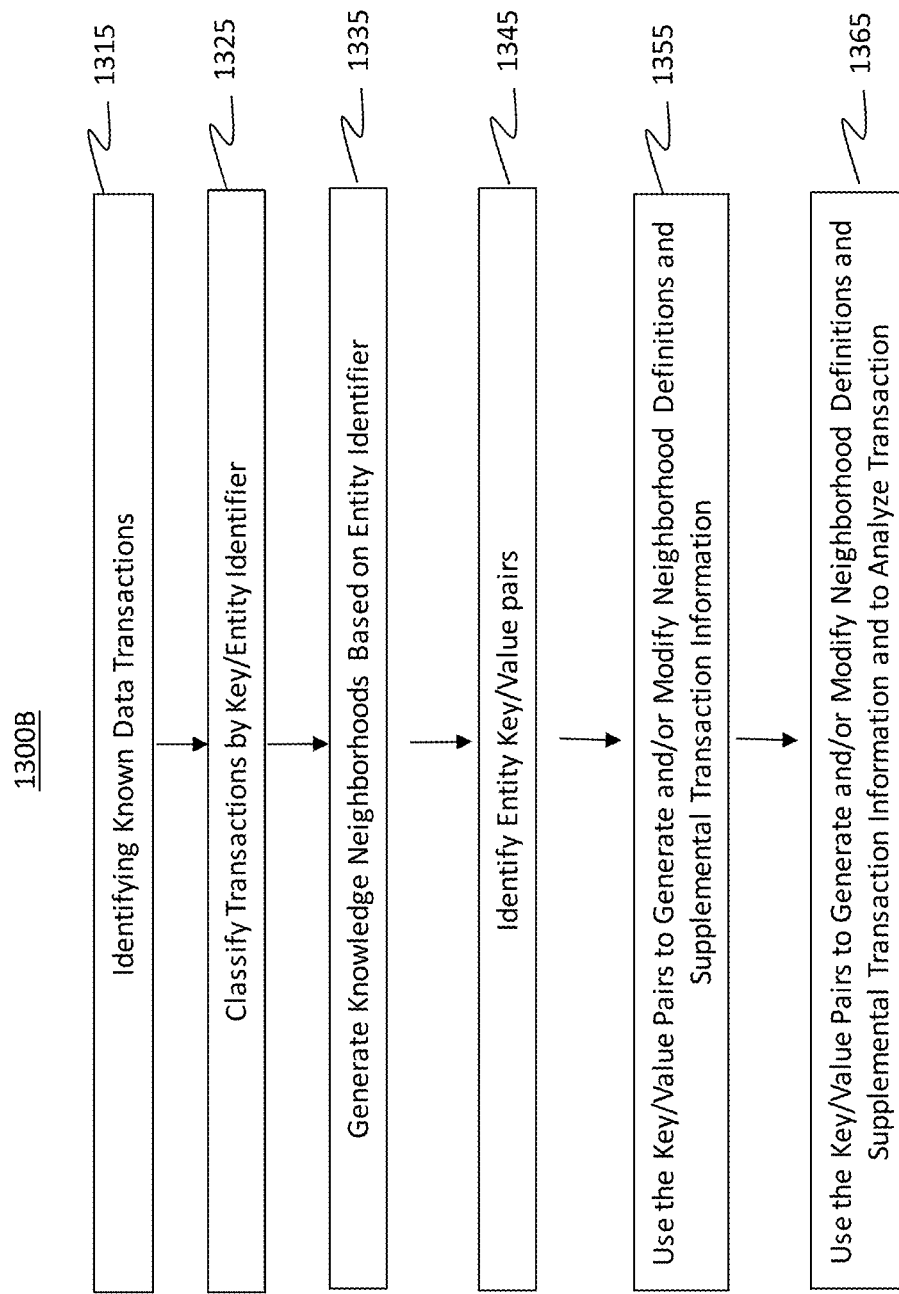
Figure 13C:
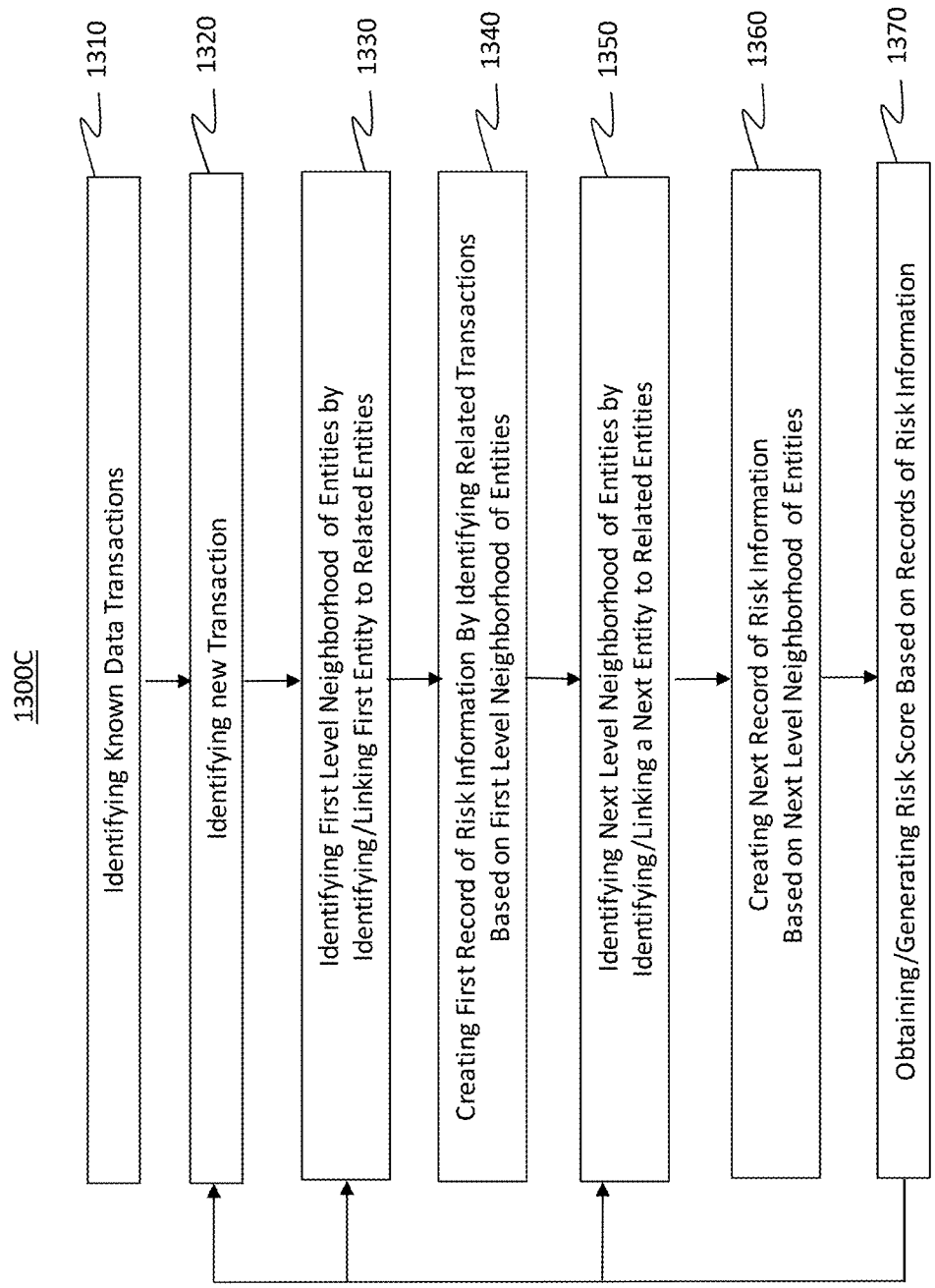

FIGS. 13A-13C illustrate flow charts of acts associated with different processes associated with methods for (1) generating/determining risk scores for one or more data transactions based on records of risk information associated with neighborhoods/hubs of related entities/transactions according to disclosed embodiments, as well as for (2) generating the neighborhoods with transaction information and transaction records/dispositions, based on relationships between different transactions and entities, based on links between entity attributes. The acts referenced in these figures will also be described in reference to FIG. 14, which illustrates a transaction computing environment.

Although the method acts may be discussed in a certain order or illustrated in a flow chart as occurring in a particular order, no particular ordering is required unless specifically stated, or required because an act is dependent on another act being completed prior to the act being performed.

Figure 14:
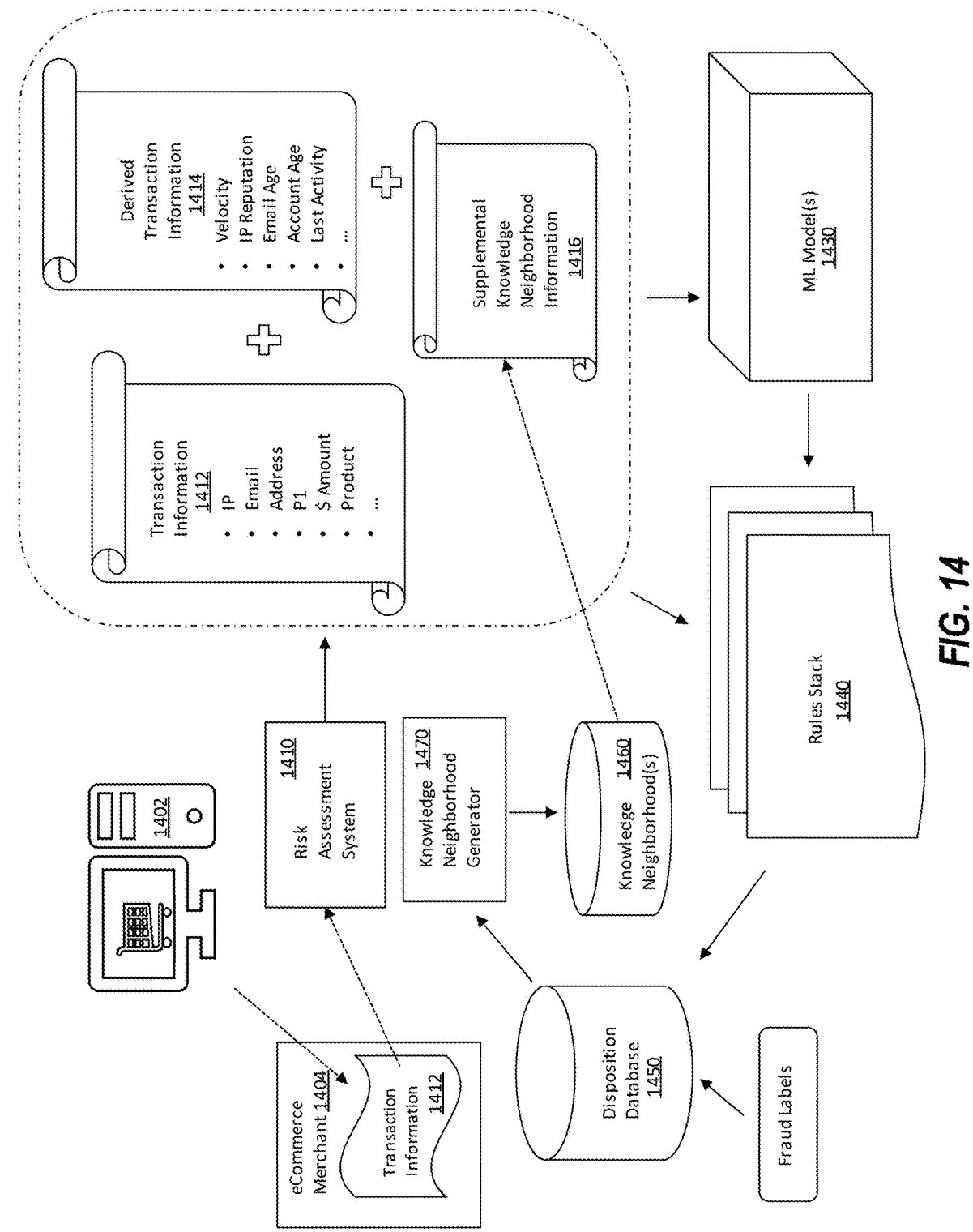
FIG. 14 illustrates a computing system that may include or be used to implement the disclosed embodiments.

FIG. 13A illustrates a flow diagram 1300A of various acts associated with generating risk scores based on transaction information. As shown in FIG. 13A, for example, a system may identify one or more known data transactions (act 1303), such as a transaction between a customer system 1402 and a merchant system 1404 (FIG. 14). The transaction information 1414 that is directly associated with that transaction, such as the IP, email, address, payment instrument (PI), transaction amount, product and/or other direct transaction information is communicated in one or more communication to the risk assessment system (1410) by the merchant or a system associated with the merchant. In some instances, this information is transmitted in real-time, while processing the transaction and making a determination on whether to authorize the transaction or not. In other instances, it is delayed after temporarily granting/authorizing the transaction.

In some instances, the risk assessment system 1410 is a consortium system that receives transaction information for a plurality of different transactions from a plurality of different merchants.

The transaction information 1412 for each of the transactions is identified by the risk assessment system (act 1306), such as by parsing out the transaction information from the plurality of communications that are received from the plurality of different merchants. This transaction information is categorized/identified by the risk assessment system into different entities. For instance, each of the different components of transaction information may be referred to as entities and entity values, respectively. Even more particularly, the IP, email, address, payment instrument (PI), transaction amount, product and other categories of information may be referred to as entities and the values of those categories/entities may be referred to as entity values.

The risk assessment system 1410 may also obtain derived transaction information 1414 (act 1309) by accessing stored records in an accessible database and/or from the merchant 1404, such as by identifying the velocity of transactions associated with a particular transaction entity (e.g., the quantity/frequency of transactions over different periods of time and/or rate of change in such transactions for that entity), the IP or other entity reputation, email, account or other entity age, last activity for an entity, and so forth. Any combination of one or more derived transaction information 1414 can be obtained for a related/linked transaction that is linked by the entity attributes.

The system also obtains knowledge neighborhood transaction information (act 1313). This information is obtained from one or more known neighborhoods (1420) associated with the transaction's entities, as defined in one or more stored neighborhood data structures. These neighborhoods and data structures are generated and expanded/modified in response to new transactions being processed and analyzed, as will be described in more detail in reference to FIG. 13B.

The supplemental knowledge neighborhood information 1416 includes values of potential fraud associated with linked and related transactions, which are directly and sometimes indirectly related by different entity attributes, as generally described earlier with reference to the knowledge neighborhoods and entity relationships described in FIGS. 5-9.

All, or any combination, of the transaction information 1412, derived transaction information 1414 and/or supplemental knowledge neighborhood information 1416 is provided to one or more machine learning model(s) 1430 (act 1313) to assess and generate a risk score associated with the transaction (act 1323). This score can then be applied to a rules stack (1440) that is used to make a disposition on a transaction (whether to grant or deny the transaction and/or whether to label the transaction as likely fraudulent or not) (act 1326). The set of transaction information (1412, 1414 and/or 1416) can also be directly provided to the rules stack that is used to make a disposition on a transaction (whether to grant or deny the transaction and/or whether to label the transaction as likely fraudulent or not), without requiring processing of the ML model(s) 1430 and risk score. In yet other instances, one or more pieces of the transaction information (1412, 1414 and/or 1416) is provided separately from the risk score and used to supplement the risk score, such as to bring greater attention/weight to that piece of transaction information, for example, such as a particular geography/location where the transaction occurred.

The ultimate decision that is made (to grant or deny a transaction and/or whether the transaction appears to be fraudulent or not) is stored with the transaction information in a database for labeling. For instance, a merchant may later provide information for labeling a particular transaction as a fraudulent transaction or, alternatively, as a valid transaction. This labelling information can be used to label the transaction in the stored disposition database 1450 to be used as ground truth for training and/or refining the ML Model(s) 1430 and/or to be used by a knowledge neighborhood generator 1470 to further define/modify the knowledge neighborhood(s) 1420.

All of the foregoing component (e.g., ML model(s), Rules Stack 1440, Disposition Database 1450, knowledge neighborhood storage 1460, and knowledge neighborhood generator 1470, and so forth, are all included within and/or utilized by the disclosed systems to implement the disclosed embodiments. It will be appreciated that these components/systems may be contained within a single integrated server and/or within a cloud or distributed system.

Attention will now be directed to FIG. 13B, which illustrates a flow diagram 1300B of related acts for generating/modifying knowledge neighborhoods used to analyze transactions.

As shown, a system may identify known data transactions (act 1315), such as those stored in disposition database 1450 and that have been classified by entity keys (act 1325). In particular, each stored transaction may be classified by its corresponding entity keys (e.g., IP, email, address, PI, transaction amount, product, and so forth). This information is provided (sent to or pulled by the knowledge neighborhood generator 1470) in batches of information for a plurality of transactions. The frequency in which the information is set at a predetermined batch quantity or frequency interval (e.g., at a rate of X times per hour/day/week/month, and/or at a rate of X quantity of newly received transactions or transactions of a particular type and/or key identifier).

The system then identifies, based on the transaction entities, different entity key/value pairs for related transactions that are related to each entity (act 1345). For instance, for a particular entity of IP, the system will identify each of the transactions that are associated with that IP from the transaction information received from the database 1450 when generating a new knowledge neighborhood and/or information from existing knowledge neighborhoods(s) when expanding/modifying an existing neighborhood. All of the identified transactions are then identified as being linked by that IP (or other entity key that is being used). The fraud rate of those related transactions can then be used to generate a corresponding fraud rate value associated with that entity.

The transaction is also evaluated to identify related entities to the entity that as evaluated, such as the corresponding email (or other entity) associated with and linked to the corresponding transaction IP (or earlier analyzed entity). This way, it is then possible to find all emails associated with that particular IP, thereby taking the next hop in analysis to identify related/linked entities in the neighborhood, thereby expanding the neighborhood. The fraud rate of all related transactions of those related emails can then be determined at that next entity level.

Additionally, for each email that is discovered at that next level, another related entity (a third type of entity) for corresponding transactions associated with the email entity level can be discovered and linked in the expanding neighborhood. Then, all entities discovered at that third entity level can then be processed to discover the corresponding/associated fraud rate at that next entity level and/or to further identify newly linked/related entities to even further expand the neighborhood, and so forth. In this manner, the system generates and/or modifies the neighborhoods and corresponding supplemental transaction information (act 1355).

The generated or modified neighborhoods and the corresponding fraud values for each entity and neighborhood level can be used as the supplement transaction information that is generated and used to further process and evaluate and/or otherwise analyze a particular transaction (act 1365), as discussed with regard to FIG. 14.

The next flowchart 1300C, as shown in FIG. 13 C, includes a combination of acts associated with the flowcharts 1300A and 1300B. For instance, as shown, a first act includes identifying a plurality of stored/known data transactions (1310), such as those that are received from the merchants and that are stored by the system described in FIGS. 12 and 14. Each particular data transaction in the plurality of data transactions including transaction attributes that define characteristics of the particular transaction, including at least one transaction attribute that associates a corresponding entity involved in the particular transaction to the particular transaction.

Next, the system identifies a new transaction (1320), which may be a transaction in the stored/known transactions, or a new separately and subsequently received transaction. This new transaction is associated with a first entity and includes the at least one transaction attribute that associates the first entity to the new transaction.

The system also identifies a first set of one or more related entities to the first entity from the plurality of recorded data transactions based on a first set of one or more attributes in the transaction attributes and links them by identifying them or defining them as belonging to a particular neighborhood of related entities (act 1330).

A record of risk information is also created by the system (act 1340) by identifying the transactions and/or transaction profiles of transactions that are included in or related to the first level of neighborhood entities and using the risk model(s) of the system to generate the risk information (e.g., statistics and other information, which may or may not be weighted depending on the hierarchical level of the neighborhood). This may also include generating a value for the entity when no transactions are identified as being related to the new transaction at the particular first level of the entity.

The system also identifies a next/second level neighborhood of entities from the recorded/known transactions (act 1350). This second level neighborhood is generated for one or more of the entities included in the first level neighborhood of entities by identifying one or more related entities related to the at least one entity from the plurality of recorded data transactions based on a second set of one or more attributes in the transaction attributes. As mentioned above, this second set of attributes may be completely different attributes and/or different hierarchical classification levels of the first set of one or more attributes.

The at least one entity is then linked to the first level neighborhood of related entities into a defined second level neighborhood of entities and a record is created of risk information associated with a second set of related transactions that includes one or more transactions from the plurality of recorded transactions for each entity in the second level neighborhood of entities (act 1360).

Finally, a risk score comprising a consortium risk score is generated from the different risk information contained in the different records of risk information (act 1370).

In some instances, the processes are repeated, such as by identifying a third set of one or more related entities to the at least one entity from the plurality of recorded data transactions for at least one entity in the second level neighborhood of entities, based on the first set or a third set of one or more attributes in the transaction attributes and by linking the at least one entity in the second level neighborhood of entities and the third set of one or more related entities into a defined third level neighborhood of entities. It may also include identifying a third set of related transactions that includes one or more transactions from the plurality of recorded transactions for each entity in the third level neighborhood of entities and creating a third record of risk information that includes information from the third set of related transactions for the third level neighborhood of entities, such that the risk score is further based at least partially on the third record of risk information.

In some embodiments, the system traverses the different hierarchical levels of classification of the at least one attribute to identify and link multiple transactions associated with said each entity of the at least one entity in the first or second level neighborhoods of entities together into a defined set of related entity transactions for each entity of at least one entity in the first or second level neighborhoods of entities.

In some instances, the generating of an entity record of risk information includes generating an entity record of risk information based on transaction information included in the defined set of related entity transactions for each entity of the at least one entity in the first or second level neighborhoods of entities and such that the risk score is further based at least partially on the entity record of risk information.

In some instances, the risk score is generated by the system using linear regression.

The system may also generate a signal that is transmitted through the disclosed interfaces for automatically approving or denying the new transaction and/or that is used by the merchant to approve or deny the new transaction based on the risk score.

In some instances, the system generates multiple risk scores and/or updates the risk scores periodically, such as on an hourly, daily or weekly basis, or on a basis of less than an hour or more than a week, according to predefined user setting and/or automatically in response to detecting new transaction information that is determined to be related to another transaction used to generate the score being updated.

The updating of risk scores may include iteratively performing acts associated with generating the first and second records of risk information, including acts for identifying the first and second sets of the one or more related entities.

In some instances, the system generates the risk score, which is a first risk score and that is based on the first and second record of risk information, as well as the third record of risk information that is used to deny the new transaction or to generate a signal for denying the transaction based on the first risk score, which would have otherwise been approved based on a second risk score, the second risk score being based on the first and second record of risk information and without being based at least partially on the third record of risk information.

Alternatively, the system may also approve the new transaction or generate a first risk score which is used for approving the new transaction, which would have otherwise been denied based on a second risk score, the second risk score being based on the first and second record of risk information and without being based at least partially on the third record of risk information.

In some instances, the computing system receiving the new transaction as a transaction record from a third party and transmits the risk score to the same or a different third party after associating the risk score with the first entity of the new transaction.

In some instances, the generating of the risk score includes using the risk information as an input into a risk model and training the risk model based on the input risk information and/or updating the risk model based on the risk information, as well as causing the updated risk model to determine the risk score with the risk information fed back into the risk model.

In a related embodiment, the system may be configured to generate a risk score associated with an entity transaction by identifying a plurality of recorded data transactions associated with a plurality of different entities, wherein each particular data transaction in the plurality of data transactions including transaction attributes that define characteristics of the particular transaction, including at least one transaction attribute that associates a corresponding entity involved in the particular transaction to the particular transaction and that includes different hierarchical levels of classification that associate the corresponding entity to the particular transaction and for linking multiple transactions together by the particular entity.

This process may also include the system identifying a new transaction associated with a first entity and that includes the at least one transaction attribute that associates the first entity to the new transaction, as well as to identify a first set of related transactions in the recorded data transactions, which are related to the new transaction, based on the at least one transaction attribute and by at least traversing the different hierarchical levels of classification to identify associations between the new transaction and the first set of related transactions.

Thereafter, the system links the new transaction and the first set of related transactions into a defined first entity neighborhood of transactions that is used to create a record of direct risk information for the first entity neighborhood of transactions based on the transaction attributes of the plurality of related transactions and the new transaction within the first entity neighborhood of transactions.

The system also identifies a second set of related transactions that includes a set of one or more related transactions from the plurality of recorded transactions associated with one or more second entity, and that is also as related to the new transaction, based on a different attribute in the transaction attributes than the at least one transaction attribute. Then, the new transaction is linked to the second set of related transactions into a defined second entity neighborhood of transactions and a record is created for reflecting direct risk information for the second entity neighborhood of transactions based on the transaction attributes of the plurality of related transactions and the new transaction within the first entity neighborhood of transactions.

In such instances, the records of direct risk information for the first and second entity neighborhoods of transactions are utilized to generate a risk score for the new transaction by the system.

The present invention may be embodied in other specific forms without departing from its spirit or characteristics. The described embodiments are to be considered in all respects only as illustrative and not restrictive and may be combined. The scope of the invention is, therefore, indicated by the appended claims rather than by the foregoing description. All changes which come within the meaning and range of equivalency of the claims are to be embraced within their scope.

What is claimed is:

1. A computing system configured to generate a risk score associated with a data transaction using a machine learning model trained using data transactions linked into different hierarchical leveled neighborhoods in order to improve performance of detecting fraud, the computing system comprising:
at least one processor;
a computer readable hardware storage device having stored computer-executable instructions which are executable by the at least one processor for configuring the computing system to perform at least:
analyze a plurality of recorded data transactions associated with a plurality of different entities, each particular data transaction in the plurality of recorded data transactions including transaction attributes that define characteristics of the particular data transaction to link related data transactions into at least one of (1) a first level neighborhood, or (2) a second level neighborhood that is different in hierarchy from the first level neighborhood, analyzing the plurality of recorded data transactions comprising:
linking related data transactions into the first level neighborhood, comprising:
identifying a first set of one or more related entities from the plurality of recorded data transactions based on a first set of one or more attributes in the transaction attributes;
linking the first set of one or more related entities into the first level neighborhood of entities;
identifying a first set of related transactions that includes one or more transactions from the plurality of recorded data transactions for each entity in the first level neighborhood of entities; and
creating a first record of risk information that includes information from the first set of related transactions for the first level neighborhood of entities;
linking related transactions into the second level neighborhood, comprising:
for at least one entity in the first level neighborhood of entities, identifying a second set of one or more related entities from the plurality of recorded data transactions based on a second set of one or more attributes in the transaction attributes;
linking the second set of one or more related entities into the second level neighborhood of entities;
identifying a second set of related transactions that includes one or more transactions from the plurality of recorded data transactions for each entity in the second level neighborhood of entities; and
creating a second record of risk information that includes information from the second set of related transactions for the second level neighborhood of entities; and
determine a risk score for a new transaction that is associated with a first entity and includes at least one transaction attribute based on the machine learning model trained using the first set of related transactions and the second set of related transactions, training the machine learning model comprising:
analyzing, by one or more merchant risk engines, the plurality of recorded data transactions, each of the one or more merchant risk engines configured to analyze recorded data transactions associated with a particular merchant;

defining, by a knowledge neighborhood generator, different entity/transaction relationships based on different hierarchical levels; and analyzing, by a consortium risk engine, results of the one or more merchant risk engines to identify different entity/transaction relationships associated with the plurality of recorded data transactions that are linked to the first level neighborhood or the second level neighborhood based on the different entity/transaction relationships defined by the knowledge neighborhood generator.

2. The computing system of claim 1, wherein the computing system is further configured to:

for at least one entity in the second level neighborhood of entities, identify a third set of one or more related entities from the plurality of recorded data transactions based on a third set of one or more attributes in the transaction attributes;

link the third set of one or more related entities into a third level neighborhood of entities;

identify a third set of related transactions that includes one or more data transactions from the plurality of recorded data transactions for each entity in the third level neighborhood of entities; and create a third record of risk information that includes information from the third set of related transactions for the third level neighborhood of entities; and wherein determining the risk score is further based at least partially on the third record of risk information.

3. The computing system of claim 2, wherein the at least one transaction attribute includes different hierarchical levels of classification, the first set of one or more attributes comprising a particular attribute at a first classification level of the different hierarchical levels of classification and the second set of one or more attributes comprising the particular attribute at a second classification level of the different hierarchical levels of classification and the third set of one or more attributes comprising the particular attribute at a third classification level of the different hierarchical levels of classification.

4. The computing system of claim 1, wherein the at least one transaction attribute includes different hierarchical levels of classification that associate at least one entity to multiple data transactions and that is usable for linking the multiple data transactions together by the at least one entity, the computing system further configured to:

for each particular entity of at least one entity in the first level neighborhood or second level neighborhoods, traverse the different hierarchical levels of classification to identify and link multiple transactions associated with said particular entity of the at least one entity in the first level neighborhood or second level neighborhood of entities together into a defined set of related entity transactions.

5. The computing system of claim 4, wherein the computing system is further configured to:

generate an entity record of risk information based on transaction information included in the defined set of related entity transactions for each entity of the at least one entity in the first level neighborhood or second level neighborhoods of entities.

6. The computing system of claim 5, wherein the risk score is further based at least partially on the entity record of risk information.

7. The computing system of claim 1, wherein the new transaction is identified separately from the plurality of recorded data transactions.

8. The computing system of claim 1, wherein the new transaction is included in the plurality of recorded data transactions.

9. The computing system of claim 2, wherein obtaining the risk score further includes generating the risk score.

10. The computing system of claim 9, wherein the generating the risk score is performed by using linear regression.

11. The computing system of claim 9, wherein the computing system is further configured to generate a signal that is used for automatically approving or denying the new transaction based on the risk score.

12. The computing system of claim 11, wherein the computing system is further configured to:

generate the risk score, which is a first risk score that is based on the first record and second record of risk information, as well as the third record of risk information; and deny the new transaction based on the first risk score, which would have otherwise been approved based on a second risk score, the second risk score being based on the first record and second record of risk information and without being based at least partially on the third record of risk information.

13. The computing system of claim 11, wherein the computing system is further configured to:

generate the risk score, which is a first risk score that is based on the first record and second record of risk information, as well as the third record of risk information; and approve the new transaction based on the first risk score, which would have otherwise been denied based on a second risk score, the second risk score being based on the first record and second record of risk information and without being based at least partially on the third record of risk information.

14. The computing system of claim 1, wherein the computing system is further configured to receive the new transaction as a transaction record from a third party and transmitting the risk score to the third party.

15. The computing system of claim 1, wherein associating the computing system is further configured to associate the risk score with the first entity in a risk record and transmitting the risk record to a plurality of different third parties.

16. The computing system of claim 1, wherein the computing system is further configured to iteratively update the first record and second record of risk information by performing acts associated with generating the first record and second record of risk information, including acts for identifying the first record and second set of one or more related entities.

17. The computing system of claim 1, wherein generating a risk score comprises:

using the risk information as an input into a risk determination model;

training the risk determination model based on the input risk information to update the risk determination model; and based on the training, causing the updated risk determination model to determine the risk score.

18. A method for generating a risk score associated with a transaction using a machine learning model trained using data transactions linked into different hierarchical leveled neighborhoods in order to improve performance of detecting fraud, the method comprising:

analyzing a plurality of recorded data transactions associated with a plurality of different entities, each particular data transaction in the plurality of recorded data transactions including transaction attributes that define characteristics of the particular data transaction to link related data transactions into at least one of (1) a first level neighborhood, or (2) a second level neighborhood that is different in hierarchy from the first level neighborhood, analyzing the plurality of recorded data transactions comprising:

linking related data transactions into the first level neighborhood, comprising:
- identifying a first set of one or more related entities from the plurality of recorded data transactions based on a first set of one or more attributes in the transaction attributes;
- linking the first set of one or more related entities into the first level neighborhood of entities;
- identifying a first set of related transactions that include one or more transactions from the plurality of recorded data transactions for each entity in the first level neighborhood of entities; and
- creating a first record of risk information that includes information from the first set of related transactions for the first level neighborhood of entities;

linking related transactions into the second level neighborhood, comprising:
- for at least one entity in the first level neighborhood of entities, identifying a second set of one or more related entities from the plurality of recorded data transactions based on a second set of one or more attributes in the transaction attributes;

linking the second set of one or more related entities into the second level neighborhood of entities:
- identifying a second set of related transactions that includes a set of one or more related transactions from the plurality of recorded data transactions for each entity in the second level neighborhood of entities; and
- creating a second record of risk information that includes information from the second set of related transactions for the second level neighborhood of entities; and determine a risk score for a new transaction that is associated with a first entity and includes at least one transaction attribute based on the machine learning model trained using the first set of related transactions and the second set of related transactions, training the machine learning model comprising:

analyzing, by one or more merchant risk engines, the plurality of recorded data transactions, each of the one or more merchant risk engines configured to analyze recorded data transactions associated with a particular merchant;

defining, by a knowledge neighborhood generator, different entity/transaction relationships based on different hierarchical levels; and analyzing, by a consortium risk engine, results of the one or more merchant risk engines to identify different entity/transaction relationships associated with the plurality of recorded data transactions that are linked to the first level neighborhood or the second level neighborhood based on the different entity/transaction relationships defined by the knowledge neighborhood generator.

19. The method of claim 18, the method further comprising:
- for at least one entity in the second level neighborhood of entities, identifying a third set of one or more related entities from the plurality of recorded data transactions based on a third set of one or more attributes in the transaction attributes;
- linking the third set of one or more related entities into a third level neighborhood of entities;
- identifying a third set of related transactions that includes one or more data transactions from the plurality of recorded data transactions for each entity in the third level neighborhood of entities; and
- creating a third record of risk information that includes information from the third set of related transactions for the third level neighborhood of entities; and
- wherein determining the risk score is further based at least partially on the third record of risk information.

20. The method of claim 19, wherein the at least one transaction attribute includes different hierarchical levels of classification, the first set of one or more attributes comprising a particular attribute at a first classification level of the different hierarchical levels of classification and the second set of one or more attributes comprising the particular attribute at a second classification level of the different hierarchical levels of classification and the third set of one or more attributes comprising the particular attribute at a third classification level of the different hierarchical levels of classification.

* * * * *